US012014583B2

(12) United States Patent
Jankowski

(10) Patent No.: US 12,014,583 B2
(45) Date of Patent: Jun. 18, 2024

(54) VEHICLE OPERATIONAL DIAGNOSTICS AND TRAILER HEALTH STATUS SYSTEM COMBINATION

(71) Applicant: Airgo IP, LLC, Oklahoma City, OK (US)

(72) Inventor: Peter Jankowski, Oklahoma City, OK (US)

(73) Assignee: Airgo IP, LLC, Oklahoma City, OK (US)

( * ) Notice: Subject to any disclaimer, the term of this patent is extended or adjusted under 35 U.S.C. 154(b) by 142 days.

(21) Appl. No.: 16/948,099

(22) Filed: Sep. 3, 2020

(65) Prior Publication Data

US 2022/0036664 A1 Feb. 3, 2022

Related U.S. Application Data

(63) Continuation-in-part of application No. 16/947,314, filed on Jul. 28, 2020.

(51) Int. Cl.

| | | |
|---|---|---|
| G07C 5/00 | (2006.01) | |
| B60C 23/00 | (2006.01) | |
| B60P 3/10 | (2006.01) | |
| B62D 53/04 | (2006.01) | |
| B62D 53/06 | (2006.01) | |
| G06V 20/56 | (2022.01) | |
| G07C 5/08 | (2006.01) | |
| H04W 4/48 | (2018.01) | |

(52) U.S. Cl.
CPC ............ *G07C 5/008* (2013.01); *B60C 23/001* (2013.01); *B60P 3/1033* (2013.01); *B62D 53/04* (2013.01); *B62D 53/06* (2013.01); *G06V 20/56* (2022.01); *G07C 5/0816* (2013.01); *H04W 4/48* (2018.02)

(58) Field of Classification Search
None
See application file for complete search history.

(56) References Cited

U.S. PATENT DOCUMENTS

| | | |
|---|---|---|
| 1,072,907 A | 9/1913 | Brooks |
| 1,083,847 A | 1/1914 | McDowell |
| 1,165,057 A | 12/1915 | Bayly |
| 1,205,504 A | 11/1916 | Bearce |
| 1,827,662 A | 10/1931 | Maas |
| 2,156,841 A | 5/1939 | Davis |
| 2,177,042 A | 10/1939 | Michael |
| 2,242,207 A | 5/1941 | Bowers |

(Continued)

FOREIGN PATENT DOCUMENTS

WO  WO2006034212  3/2006

*Primary Examiner* — Todd Melton
(74) *Attorney, Agent, or Firm* — Hall Estill Law Firm

(57) ABSTRACT

A vehicle operational diagnostics and condition response system includes at least an axle supporting a cargo transport unit frame, a suspension disposed between and secured to each the cargo transport unit frame and the axle, a load detection device interacting with the suspension and communicating with a system controller, wherein the system controller is supported by the cargo transport unit frame, and a cargo transport unit health status system supported by the cargo transport unit and configured to communicate with the system controller. The cargo transport unit health status system provides state status information for monitored operational elements of the cargo transport unit.

20 Claims, 30 Drawing Sheets

(56) References Cited

U.S. PATENT DOCUMENTS

| | | |
|---|---|---|
| 2,657,731 A | 11/1953 | Gozzoli |
| 2,849,047 A | 8/1958 | Lamont |
| 2,976,606 A | 3/1961 | Huet |
| 3,276,503 A | 10/1966 | Kilmarx |
| 3,367,722 A | 2/1968 | Miyanaga |
| 3,705,614 A | 12/1972 | Juttner |
| 3,838,717 A | 10/1974 | Wolf |
| 4,154,279 A | 5/1979 | Tsuruta |
| 4,387,931 A | 6/1983 | Bland |
| 4,582,107 A | 4/1986 | Scully |
| 4,641,698 A | 2/1987 | Bitonti |
| 4,685,501 A | 8/1987 | Williams |
| 4,805,681 A | 2/1989 | Vollmer |
| 4,844,138 A | 7/1989 | Kokubu |
| 4,883,106 A | 11/1989 | Schultz |
| 4,924,926 A | 5/1990 | Schultz |
| 5,080,156 A | 1/1992 | Bartos |
| 5,080,157 A | 1/1992 | Oerter |
| 5,174,839 A | 12/1992 | Schultz |
| 5,236,028 A | 8/1993 | Goodell |
| 5,287,906 A | 2/1994 | Stech |
| 5,377,736 A | 1/1995 | Stech |
| 5,398,743 A | 3/1995 | Bartos |
| 5,429,167 A | 7/1995 | Jensen |
| 5,478,974 A | 12/1995 | O'Dea |
| 5,482,358 A | 1/1996 | Kuck |
| 5,538,062 A | 7/1996 | Stech |
| 5,558,408 A | 9/1996 | Naedler |
| 5,584,949 A | 12/1996 | Ingram |
| 5,650,930 A | 7/1997 | Hagenbuch |
| 5,735,364 A | 4/1998 | Kinoshita |
| 5,752,746 A | 5/1998 | Perry |
| 5,767,398 A | 6/1998 | Naedler |
| 5,769,979 A | 6/1998 | Naedler |
| 5,780,782 A | 7/1998 | O'Dea |
| 5,863,057 A | 1/1999 | Wessels |
| 6,037,550 A | 3/2000 | Bradley |
| 6,105,645 A | 8/2000 | Ingram |
| 6,435,238 B1 | 8/2002 | Hennig |
| 6,449,582 B1 | 9/2002 | Chaklader |
| 6,585,019 B1 | 7/2003 | Ingram |
| 6,688,168 B1 | 2/2004 | Elliott |
| 6,803,530 B2 | 10/2004 | Carlstrom |
| 6,921,100 B2 | 7/2005 | Mantini |
| 6,968,882 B2 | 11/2005 | Ingram |
| 6,970,094 B2 | 11/2005 | Yamashita |
| 6,983,883 B2 | 1/2006 | Ridling |
| 7,072,763 B2 | 7/2006 | Saxon |
| 7,302,980 B2 | 12/2007 | Ingram |
| 7,418,989 B2 | 9/2008 | Ingram |
| 7,572,988 B1 | 8/2009 | Morton |
| 7,681,431 B2 | 3/2010 | Roquemore, III |
| 7,705,715 B2 | 4/2010 | Hax |
| 8,374,748 B2 | 2/2013 | Jolly |
| RE45,012 E | 7/2014 | Jones |
| 9,145,559 B2 | 9/2015 | Shaul et al. |
| 9,631,969 B1 | 4/2017 | Whalen |
| 10,388,161 B2 * | 8/2019 | Troutman ............ G07C 5/0825 |
| 2002/0179345 A1 | 12/2002 | Bell |
| 2003/0060923 A1 | 3/2003 | Scotese |
| 2004/0178005 A1 | 9/2004 | Carlstrom |
| 2004/0187568 A1 | 9/2004 | Locatelli |
| 2005/0133134 A1 | 6/2005 | Ingram |
| 2006/0179929 A1 | 8/2006 | Becker |
| 2009/0187343 A1 | 7/2009 | Koch-Groeber |
| 2010/0045209 A1 | 2/2010 | Daley |
| 2011/0022248 A1 | 1/2011 | McQuade |
| 2013/0325253 A1 | 12/2013 | Watanabe |
| 2014/0032039 A1 | 1/2014 | Dwan |
| 2014/0129046 A1 | 5/2014 | Engstrand |
| 2014/0261939 A1 | 9/2014 | Therber |
| 2015/0034399 A1 | 2/2015 | Clayton |
| 2015/0226598 A1 | 8/2015 | Lawn |
| 2016/0023588 A1 | 1/2016 | Peterson |
| 2016/0046299 A1 | 2/2016 | Fung |
| 2016/0257355 A1 | 9/2016 | Siuchta |
| 2017/0030764 A1 | 2/2017 | Lawn |
| 2018/0186208 A1 | 7/2018 | Coombs |
| 2018/0244281 A1 | 8/2018 | Jankowski |
| 2019/0367107 A1 * | 12/2019 | Grossman ............ B62D 53/125 |
| 2020/0338941 A1 * | 10/2020 | Slade .................... B62D 63/08 |
| 2021/0049836 A1 * | 2/2021 | Covington .......... B60R 16/0234 |
| 2021/0237574 A1 * | 8/2021 | Jahns .................... B60K 35/00 |

\* cited by examiner

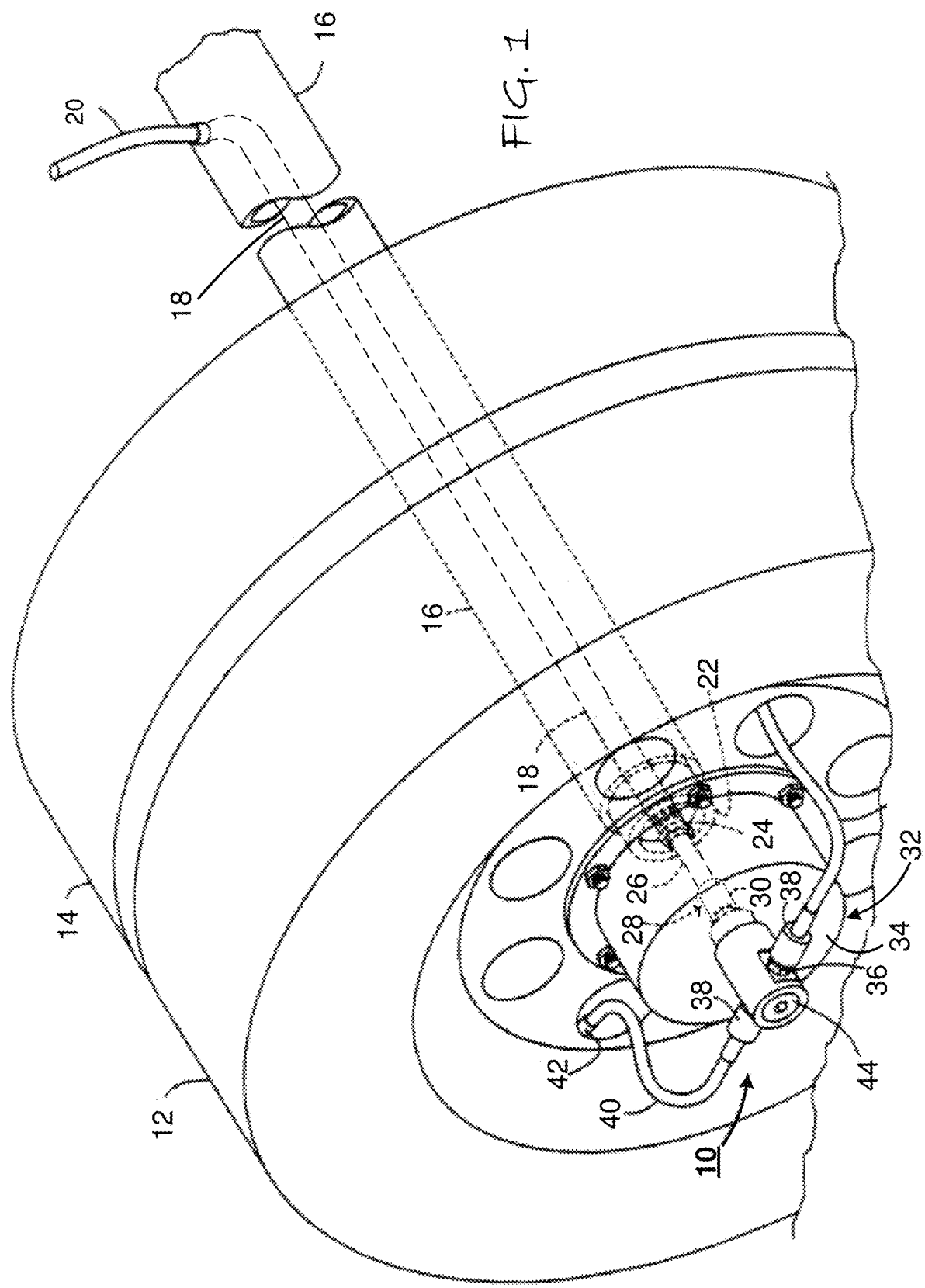

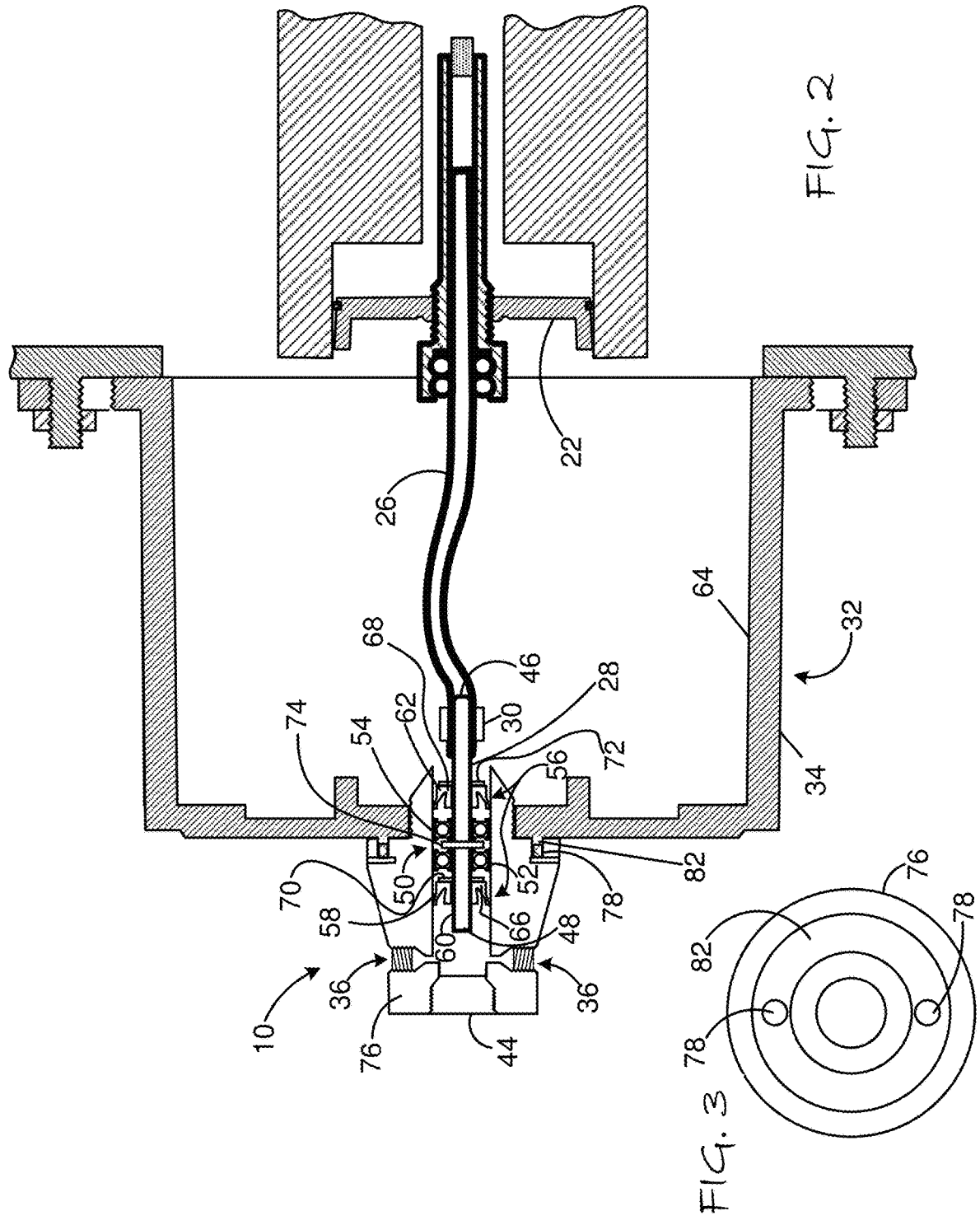

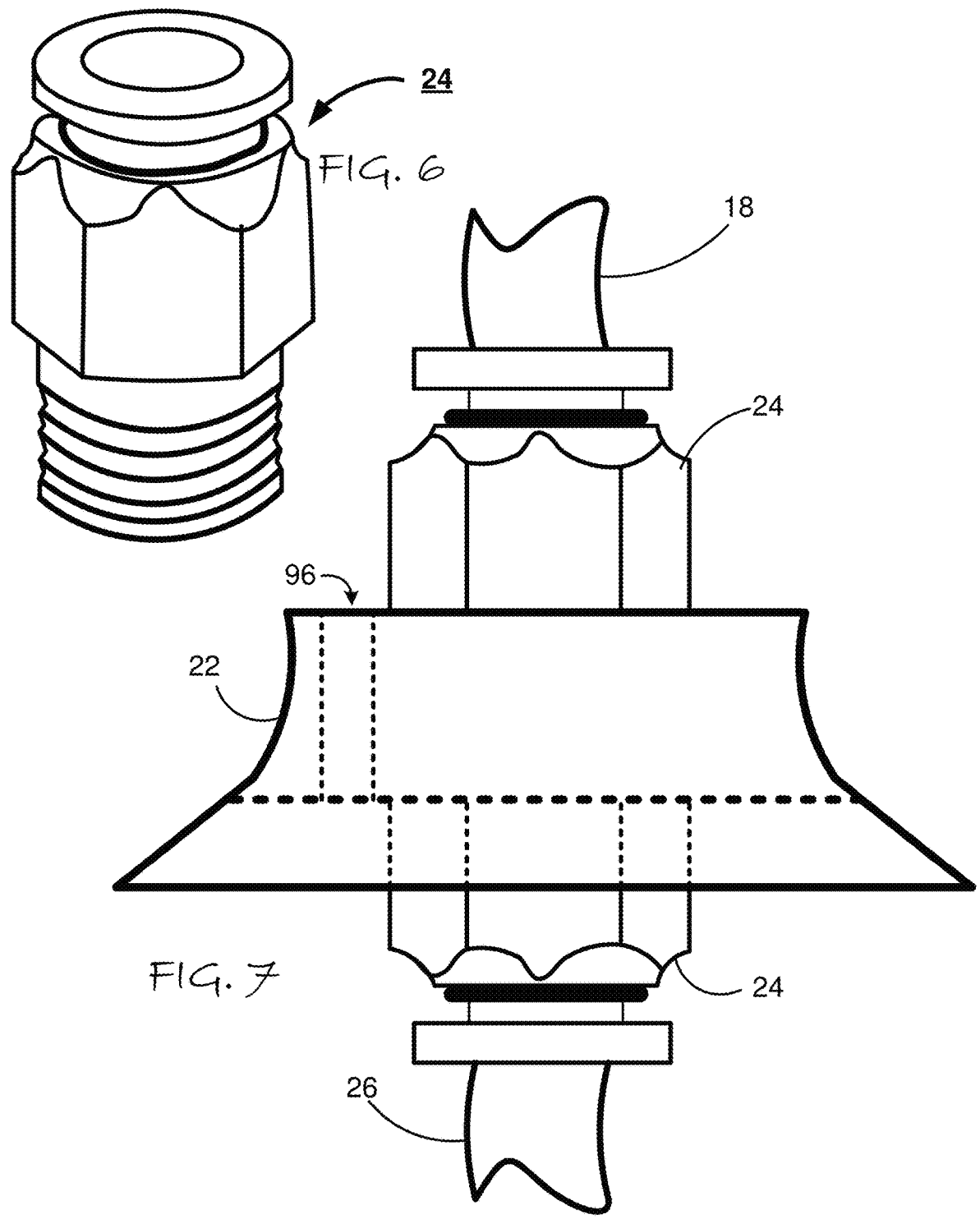

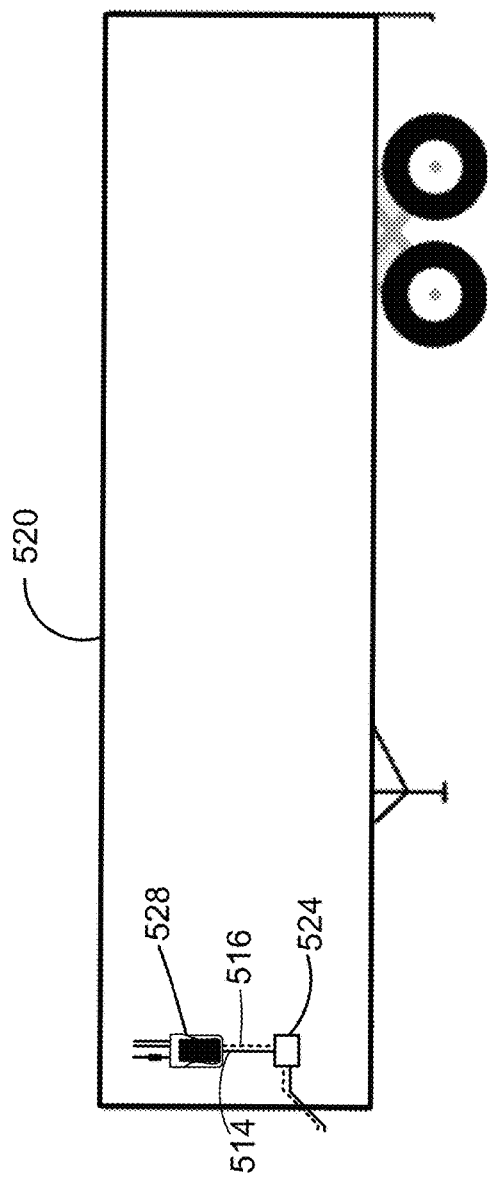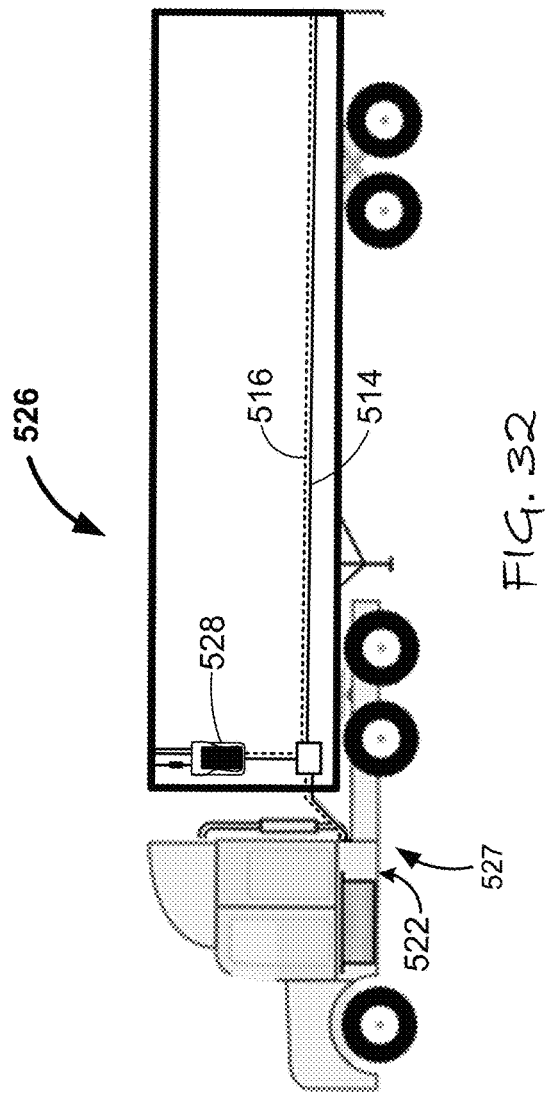

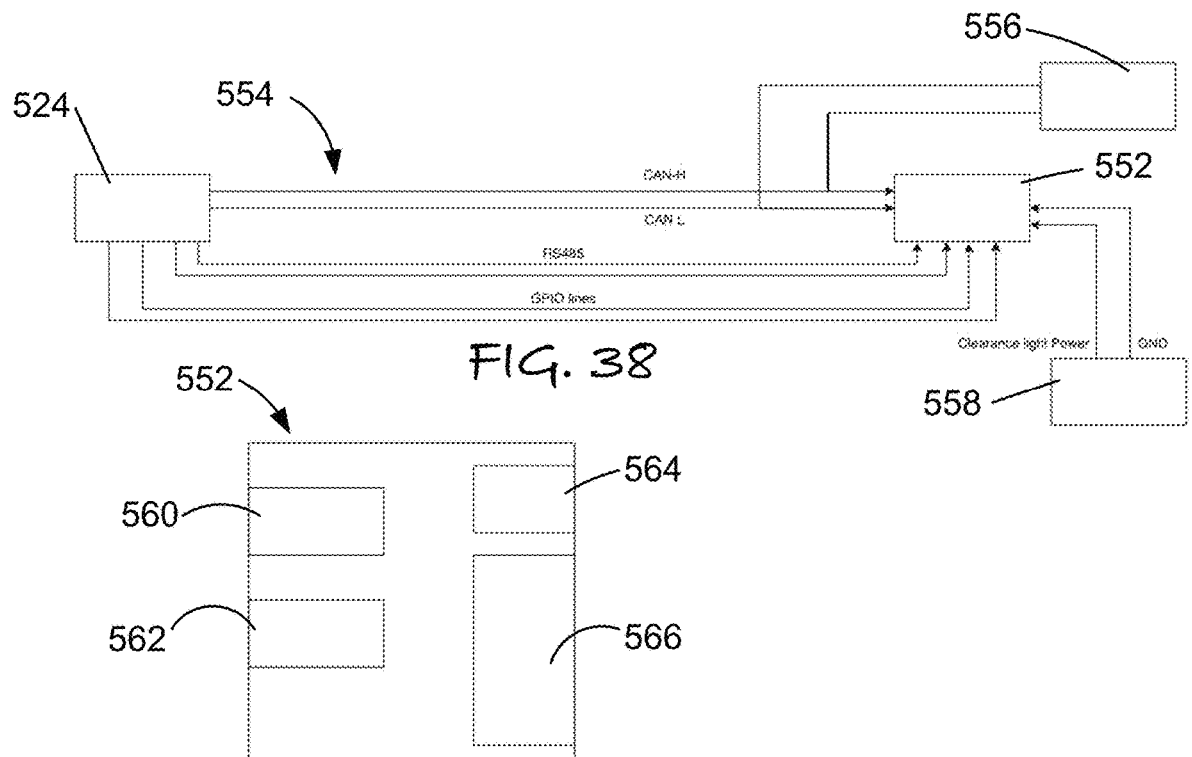
FIG. 38
FIG. 39
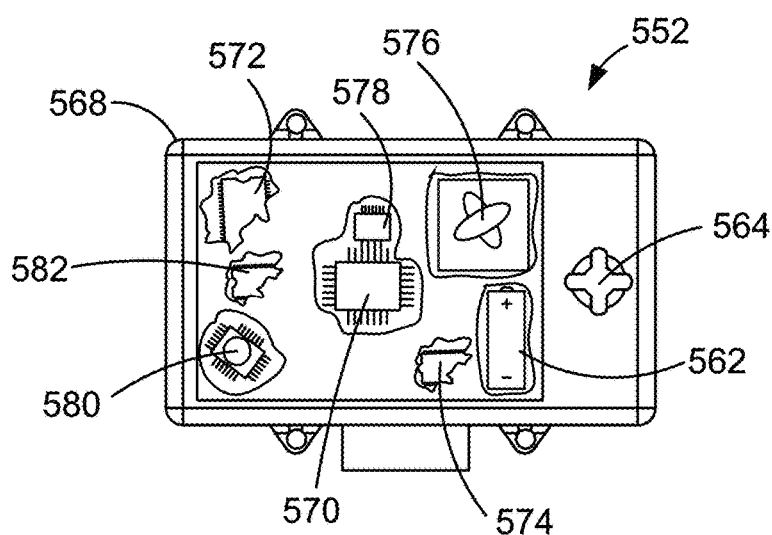
FIG. 40

VEHICLE OPERATIONAL DIAGNOSTICS AND TRAILER HEALTH STATUS SYSTEM COMBINATION

CROSS REFERENCE TO RELATED APPLICATIONS

This application is a continuation-in-part of copending U.S. patent application Ser. No. 16/947,314 filed Jul. 28, 2020 entitled "Vehicle Operational Diagnostics, Condition Response, Vehicle Pairing, and Blind Spot Detection System".

FIELD OF THE INVENTION

The present invention relates to the field of tire pressure maintenance. More particularly, the present invention relates to: the management of tire pressure of tires supporting semi-tractors and semi-trailers, even while the tractor trailer pair are traveling along a roadway; the electronic pairing of semi-tractors to semi-trailers; and to the provisional condition or state status reporting of monitored operational elements trailer.

BACKGROUND OF THE INVENTION

As tire inflation systems become adopted for broader uses, reliability and ease of maintenance, as well as an ability to manage under inflated as well as over inflated tires, as well as tractor-trailer diagnostics have emerged as important demands from the industry, accordingly improvements in apparatus and methods of installing tire inflation systems, diagnostics, and system response techniques are needed and it is to these needs the present invention is directed.

SUMMARY OF THE INVENTION

In accordance with preferred embodiments, a vehicle operational diagnostics and condition response system includes at least an axle supporting a cargo transport unit frame, a suspension disposed between and secured to each the cargo transport unit frame and the axle, a load detection device interacting with the suspension and communicating with a system controller, wherein the system controller is supported by the cargo transport unit frame, and a cargo transport unit health status system supported by the cargo transport unit and configured to communicate with the system controller. The cargo transport unit health status system provides state status information for monitored operational elements of the cargo transport unit.

These and various other features and advantages that characterize the claimed invention will be apparent upon reading the following detailed description and upon review of the associated drawings.

BRIEF DESCRIPTION OF THE DRAWINGS

The present invention is illustrated by way of example and not limitation in the figures of the accompanying drawings, in which like references indicate similar elements and in which:

FIG. 1 is a partial perspective view of a rotary union assembly of the present novel tire pressure management system shown secured to an outer wheel of a pair of tractor trailer tires mounted on a stationary axle.

FIG. 2 is a sectional side view of the rotary union assembly of the present novel tire pressure management system and associated axle spindle.

FIG. 3 is bottom plan view of the rotary union assembly of the present novel tire pressure management system.

FIG. 6 is a view in perspective of a push to connect fluid fitting of the rotary union assembly of FIG. 1.

FIG. 7 is a side elevation view of a pair of push to connect fluid fittings of the present novel tire pressure management system of FIG. 1.

FIG. 31 shows a view in elevation of a semi-trailer of the semi-tractor/trailer combination with a trailer system control unit supported by the semi-trailer.

FIG. 32 shows a view in elevation of the semi-tractor/trailer combination, showing the semi-tractor control system communicating with the semi-trailer control system, which combine to form a semi-tractor/trailer combination pairing system.

FIG. 38 shows an example system block diagram of the cargo transport unit health status system.

FIG. 39 shows an internal block diagram of an embodiment of an example vehicle status device.

FIG. 40 shows, in cutaway, various components of an example vehicle status device.

DESCRIPTION OF PREFERRED EMBODIMENTS

Figure 4:
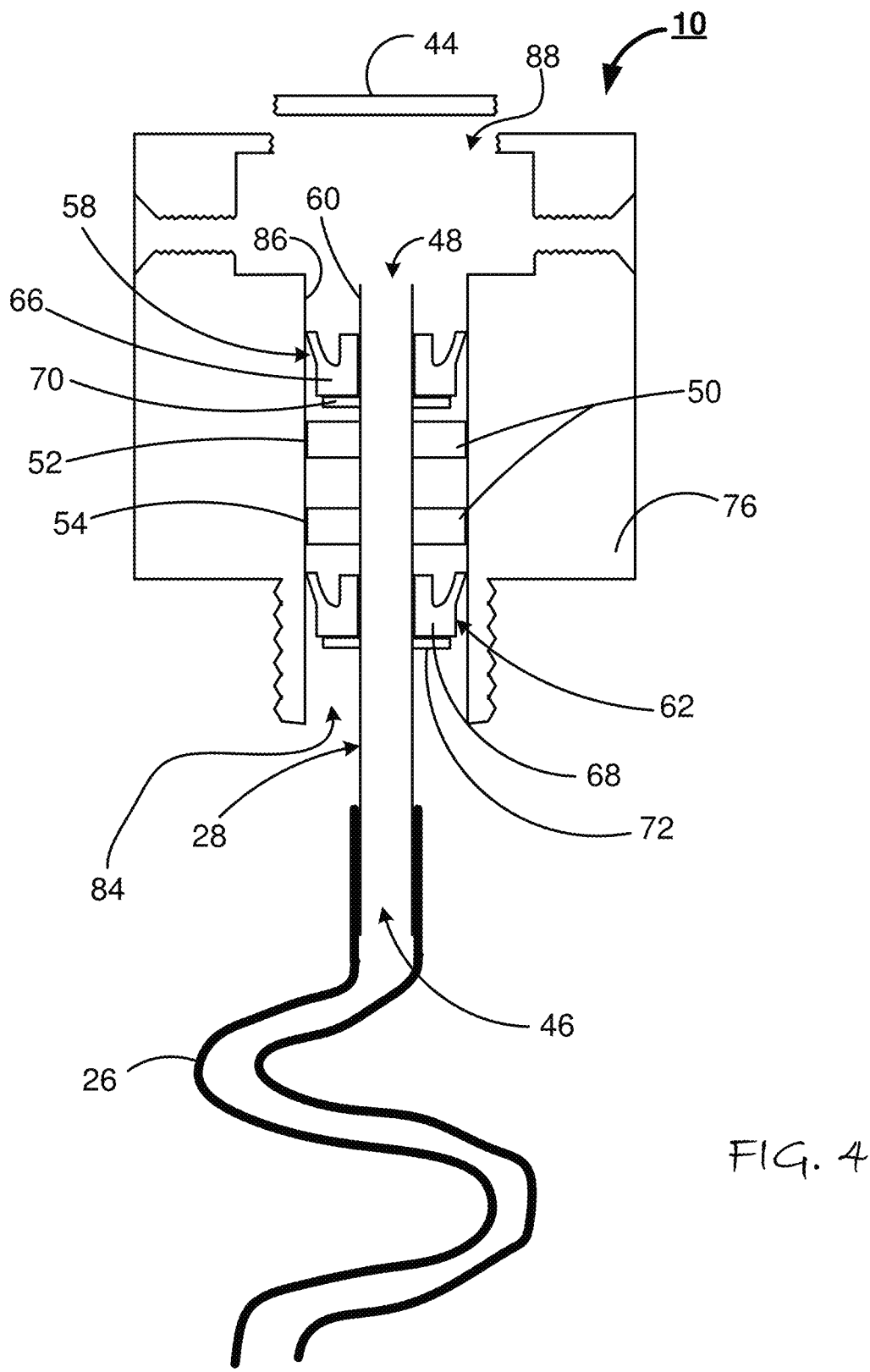
FIG. 4 is a cross-sectional side view of the rotary union housing, air lines and associated seals preferably employed by the present novel tire pressure management system.

It will be readily understood that elements of the present invention, as generally described and illustrated in the Figures herein, could be arranged and designed in a wide variety of different configurations. Referring now in detail to the drawings of the preferred embodiments, the rotary union assembly 10 (also referred to herein as assembly 10, and rotary union 10) of the first preferred embodiment, while useable on a wide variety of movable vehicles employing stationary axles for automatically maintaining the inflation pressure of the pneumatic tires thereon, is particularly adapted for use on tractor trailers. Accordingly, the assembly 10 of the first preferred embodiment will be described in conjunction with a pair of adjacent vehicle tires 12 and 14 mounted on a stationary tractor trailer axle 16 (also referred to herein as trailer axle 16, and axle 16). While identical rotary union assemblies 10 are provided at the end of each axle on the trailer to maintain the inflation pressure of the tires carried thereby, in each: the preferred embodiment; the alternate preferred embodiment; and the alternative preferred embodiment, reference will be made to only one such assembly and the pair of tires it services.

Preferably, the trailer axle 16 which carries tires 12 and 14 is sealed and functions as a source for pressurized fluid, else houses an air supply line 18 to supply air to the rotary union assembly 10. A fluid supply line 20 preferably provides air under pressure to the interior of the axle 16, else to an air supply line 18, from the conventional air compressor on the tractor via a standard pressure protection valve and control box (not shown) to pressurize the axle 16, else to pressurize the air supply line 18, at the cold tire pressure of the trailer tires. FIG. 1 further shows that the axle 16 supports an axle plug 22, which in turn supports a push to connect fluid fitting 24. Preferably, the push to connect fluid fitting 24 is attached to and in fluid communication with a fill tube 26, which in a preferred embodiment is a flexible fill tube 26. Preferably, the flexible fill tube 26 is connected to a fluid conduit 28, which supplies pressurized air to the rotary union assembly 10. Preferably, the flexible fill tube 26 is secured to the fluid conduit 28, by a compression fitting 30. As those skilled in the art would know, a compression fitting, or alternate mechanical means, could serve the function of the push to connect fluid fitting 24.

In a preferred embodiment, the rotary union assembly 10 is mounted to a hubcap 32, from an exterior 34 of the hubcap 32, and provides pressurized air, by way of an air delivery channel 36, to tire pressure hose fittings 38 that are secured to tire pressure hoses 40. Each tire pressure hose 40 supplies the pressurized air to tire valve stems 42 of tires 12 and 14. Preferably, the rotary union assembly 10 provides a removable seal access cover 44, which mitigates escapement of pressurized fluid from the air delivery channel 36, the tire pressure hoses 40, and the tires 12 and 14.

As seen in FIGS. 2 and 3, the fluid conduit 28 provides a downstream end 48 and an upstream end 46, and the rotary union assembly 10 further preferably includes a pair of bearings 50, in which each of the pair of bearings 50 provides an inner race and an outer race. In a preferred embodiment, a first bearing 52, of the pair of bearings 50, is adjacent the downstream end 48, of the fluid conduit 28, while the second bearing 54, of the pair of bearings 50, is adjacent the upstream end 46, of the fluid conduit 28.

FIG. 2 further shows that in a preferred embodiment, the rotary union assembly 10, further includes a pair of fluid seals 56, with a first fluid seal 58, is preferably disposed between the first bearing 52, and the downstream end 48 of the fluid conduit 28, while the second fluid seal 62, of the pair of fluid seals 56, is preferably disposed between the second bearing 54, and the upstream end 46, of the fluid conduit 28. In a preferred embodiment, the second fluid seal 62 mitigates transfer of an environment contained within an interior 64, of the hubcap 32, from entry into the pair of bearings 50.

FIG. 2 further shows that in a preferred embodiment, each of the pair of fluid seals 56 (58 and 62), provide a base portion (66 and 68 respectfully), and the rotary union assembly 10, further includes: a first fluid seal restraint 70, which is disposed between the first bearing 52, and the base portion 66 of the first fluid seal 58, and in pressing engagement with the external surface 60 of the fluid conduit 28; and a second fluid seal restraint 72, which is disposed between the base portion 68 of the second fluid seal 62, and in pressing engagement with the external surface 60 of the fluid conduit 28. FIG. 2 still further shows that the rotary union 10, preferably includes a bearing spacer 74, disposed between the first bearing 52 and the second bearing 54 of the pair of bearings 50. The bearing spacer 74 provides stability of the first and second bearings (52, 54) during the process of pressing the pair of bearings 50 into a rotary union housing 76, of the rotary union assembly 10.

As discussed hereinabove, in a preferred embodiment, the second fluid seal 62, mitigates transfer of an environment contained within an interior 64, of the hubcap 32, from entry into the pair of bearings 50. However, if the environment within the hubcap 32 elevates in pressure, a spring loaded pressure relief valve 78 (such as a poppet valve), else a pressure relief seal 80 (of FIG. 9) also referred to herein as a pressure equalization structure 80 (of FIG. 11), confined by an excess pressure collection chamber 82 (which is provided by the rotary union housing 76, and is in contact adjacency with the exterior 34, of the hubcap 32, and shown by FIGS. 2 and 3), activates to relieve the pressure present in the pressure collection chamber 82, to atmosphere. That is, when the pressure contained by the pressure collection chamber 82 reaches a predetermined pressure level, which in a preferred embodiment is in the range of 5 to 8 PSI.

FIG. 4 shows a preferred embodiment that preferably includes at least the rotary union housing 76, supporting and confining the fluid conduit 28, within a central bore 84 (also referred to herein as channel 84), of the rotary union housing 76. The fluid conduit 28 preferably provides the downstream end 48 and the upstream end 46. Further shown by FIG. 4 is the pair of bearings 50; each of the pair of bearings 50 provides an inner race and an outer race. Each inner race of the pair of bearings 50, is in pressing communication with the external surface 60, of the fluid conduit 28, and each outer race of the pair of bearings 50, is in pressing communication with a bore surface 86 (also referred to herein as wall 86), of the central bore 84, of the rotary union housing 76. The first bearing 52, of the pair of bearings 50, is adjacent the downstream end 48, of the fluid conduit 28, and the second bearing 54, of the pair of bearings 50, is adjacent the upstream end 46, of the fluid conduit 28.

FIG. 4 further shows that in a preferred embodiment, the rotary union 10 preferably includes a pair of fluid seals 56, the first fluid seal 58, of the pair of fluid seals 56, engages the external surface 60, of the fluid conduit 28, and is disposed between the first bearing 52, and the downstream end 48, of said fluid conduit 28. The second fluid seal 62, of the pair of fluid seals 56, engages the external surface 60 of the fluid conduit 28, and is disposed between said second bearing 54, and the upstream end 46, of the fluid conduit 28. In a preferred embodiment, the first fluid seal 58 provides the base portion 66, and the first fluid seal restraint 70, which is in pressing contact with the external surface 60 of the fluid conduit 28, abuts against the base portion 66, of the first fluid seal 58, to maintain the relative position of the first fluid seal 58, adjacent the bore surface 86, of the central bore 84; and the second fluid seal 62, provides the base portion 68, and the second fluid seal restraint 72, which is in pressing contact with the external surface 60 of the fluid conduit 28, abuts against the base portion 68, of the second fluid seal 62, to maintain the relative position of the second fluid seal 62, adjacent the bore surface 86, of the central bore 84. In a preferred embodiment, the rotary union housing 76 further provides a fluid distribution chamber 88 (also referred to herein as a fluid chamber 88), which is in fluid communication with the downstream end 48, of the fluid conduit 28. The fluid chamber 88, receives pressurized air from the fluid conduit 28, and transfers the received pressurized air to the tires 12 and 14 (of FIG. 1).

Figure 5:
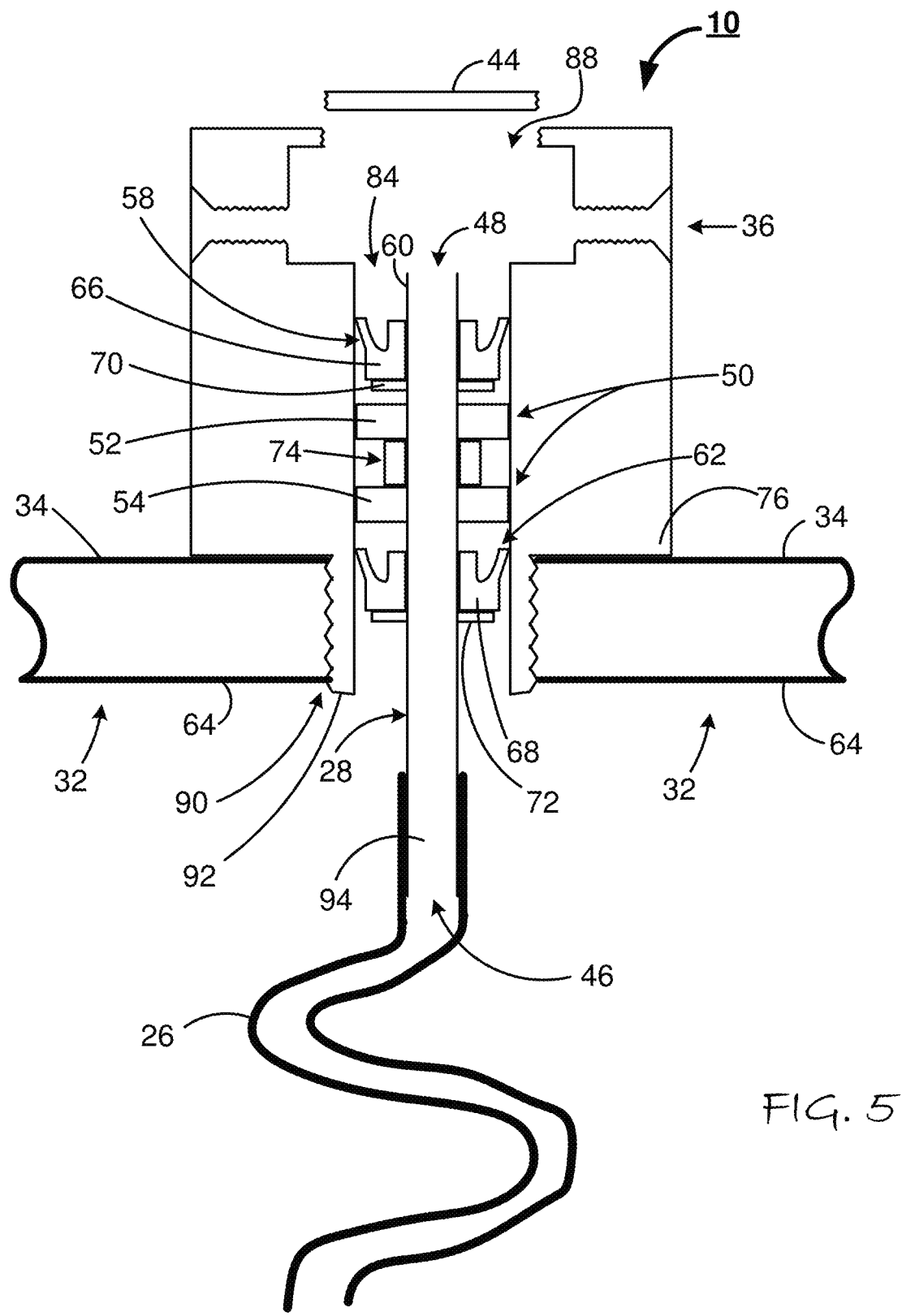
FIG. 5 is a cross-sectional side view of an alternate rotary union assembly of the present novel tire pressure management system and its associated bearings and bearing spacer.

FIG. 5 shows that in a preferred embodiment, the hubcap 32 provides an attachment aperture 90. The attachment aperture 90 is preferably disposed between the interior 64 and the exterior 34, of the hubcap 32. The attachment aperture 90 provides an axis of rotation, which is preferably substantially aligned with an axis of the axle 16 (of FIG. 1). Additionally, the rotary union housing 76 provides at least an attachment member 92, which preferably is in mating communication with the attachment aperture 90. FIG. 5 further shows that the fluid conduit 28 provides a fluid communication portion 94, which extends beyond the attachment member 92, and into the interior of said hubcap 32.

FIGS. 6 and 7 show the push to connect fluid fitting 24, of a preferred embodiment. The push to connect fitting, model No. 1868X4 by Eaton Weatherhead, of Maumee, Ohio is an example of a push to connect fitting of the type found useful in a preferred embodiment. FIG. 7 shows that in a preferred embodiment, two push to connect fluid fittings 24, are secured to the axle plug 22. In a preferred embodiment, one of the pair of push to connect fluid fittings 24 is in fluid communication with the air supply line 18, while the other is in fluid communication with the fill tube 26. FIG. 7 shows that in a preferred alternate embodiment, the axle plug 22, provides a pressure transfer conduit 96, which is used to disburse pressurized air, which may accumulate in the interior 64, of the hubcap 32 (both of FIG. 4), back into the axle housing 16, when the air supply line 18, is utilized to convey pressurized air to the rotary union 10 (of FIG. 2).

Figure 8:
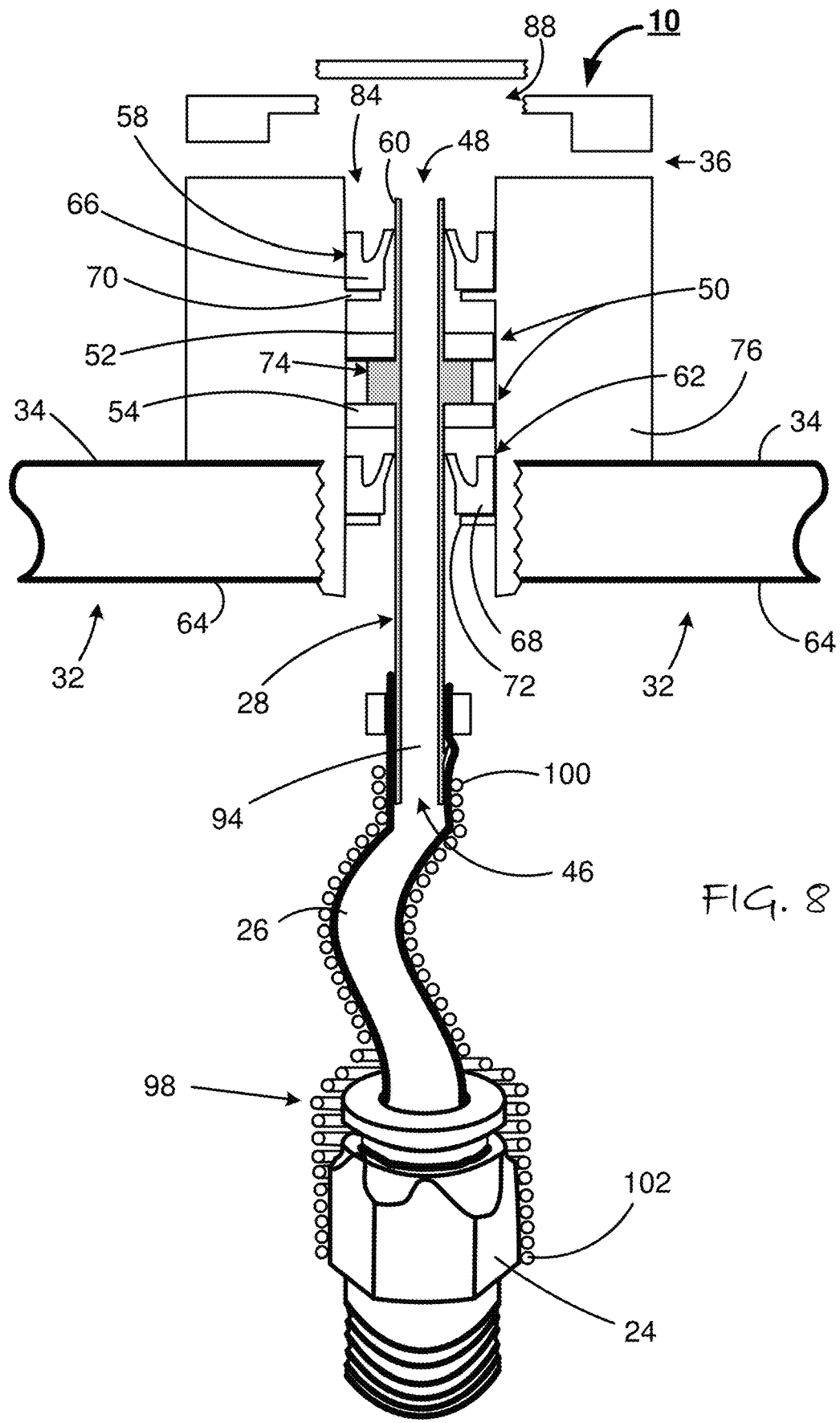
FIG. 8 is a cross-section view of the rotary union housing of an alternative rotary union assembly of the present novel tire pressure management system showing an anti-rotational means.

FIG. 8 depicts an alternate preferred embodiment of the present invention, in which the fluid conduit 28, provides the bearing spacer 74, and the rotary union housing 76 provides the first fluid seal restraint 70. Additionally, in a preferred embodiment, the fill tube 26 is a flexible fill tube formed from a polymer, such as a polyurethane based material, else a metallic material, such as a shape memory alloy. FIG. 8 further shows that when the flexible fill tube 26 is connected to the push to connect fluid fitting 24, an anti-rotational means 98 is incorporated into the rotary union 10. Preferably, the anti-rotational means 98 has a first end 100, and a second end 102. The first end 100 of the anti-rotational means 98, is secured to the flexible fill tube 26, adjacent the fluid communication portion 94. The second end 102, of the anti-rotational means 98, connects to the push to connect fluid fitting 24. Preferably, the anti-rotational means 98 mitigates rotation of the fill tube 26, when the rotary union housing 76, in conjunction with the hubcap 32, rotates about the fluid conduit 28. By example, but not by limitation, a coiled spring has been found useful as the anti-rotational means 98, in an alternate example, but not by way of limitation, a torsion bar 104 (of FIG. 9) has been found useful to serve as an anti-rotational means 98. However, as those skilled in the art will appreciate, any of a host of mechanical structures, which serve to mitigate rotation of the fill tube 26, when the rotary union housing 76, in conjunction with the hubcap 32, rotates about the fluid conduit 28 may be employed to serve this purpose.

Figure 9:
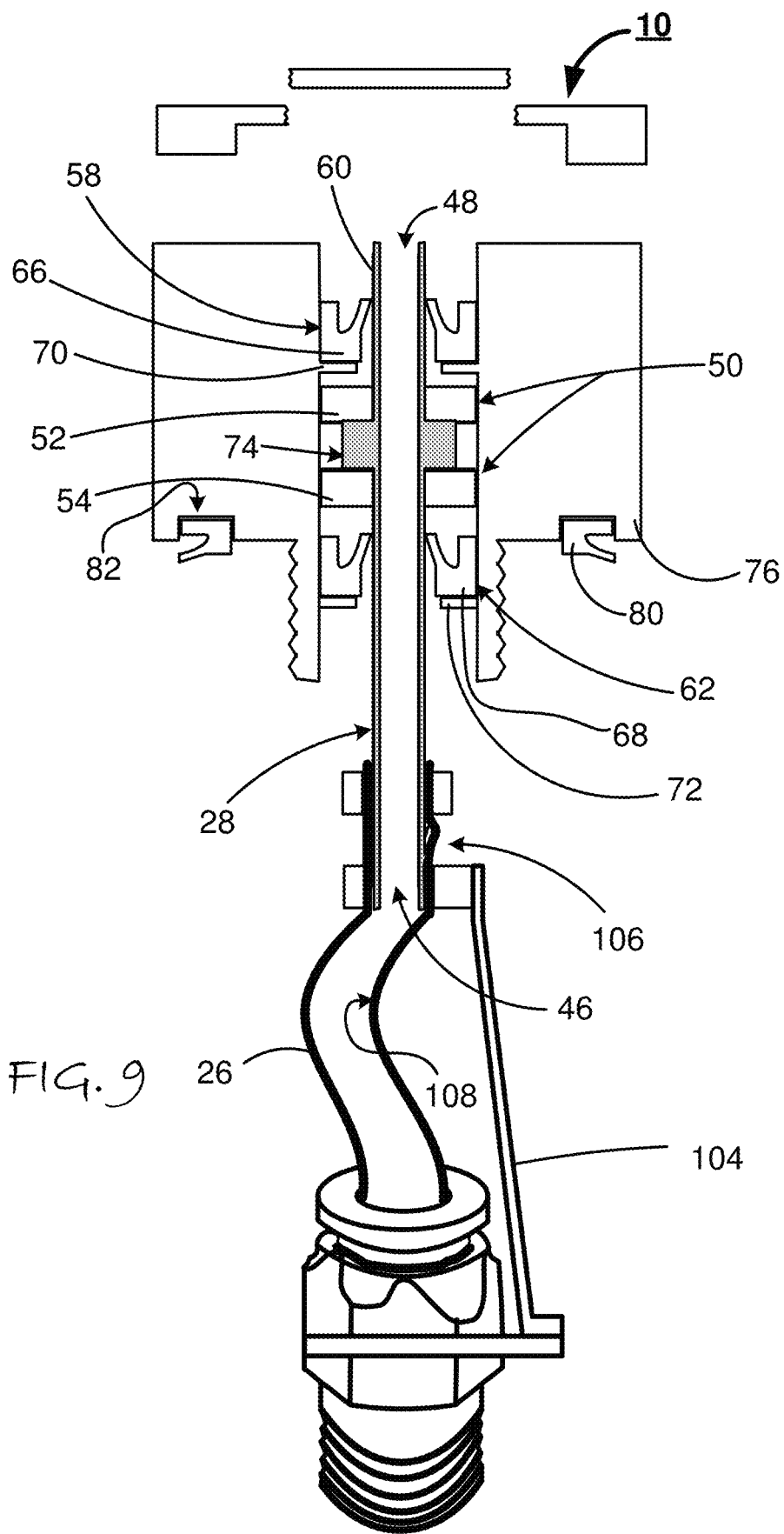
FIG. 9 is a cross-section view of the rotary union housing of the alternative rotary union assembly of FIG. 8, of the present novel tire pressure management system showing an alternate anti-rotational means.

In an alternate preferred embodiment, in addition to the fluid chamber 88, the rotary union housing 76, further provides the air delivery channel 36, which is in fluid communication with, and extending radially from, said fluid chamber 88, as shown by FIG. 8, the fluid conduit 28, further provides a retention barb 106, protruding from the fluid conduit 28, and communicating with an interior surface 108, of said flexible fill tube 26. The retention barb 106, mitigates an inadvertent removal of said flexible fill tube 26, from the fluid conduit 28. The retention barb 106, is preferably positioned adjacent to, and downstream from the compression fitting 30, as shown by FIG. 9.

Figure 10:
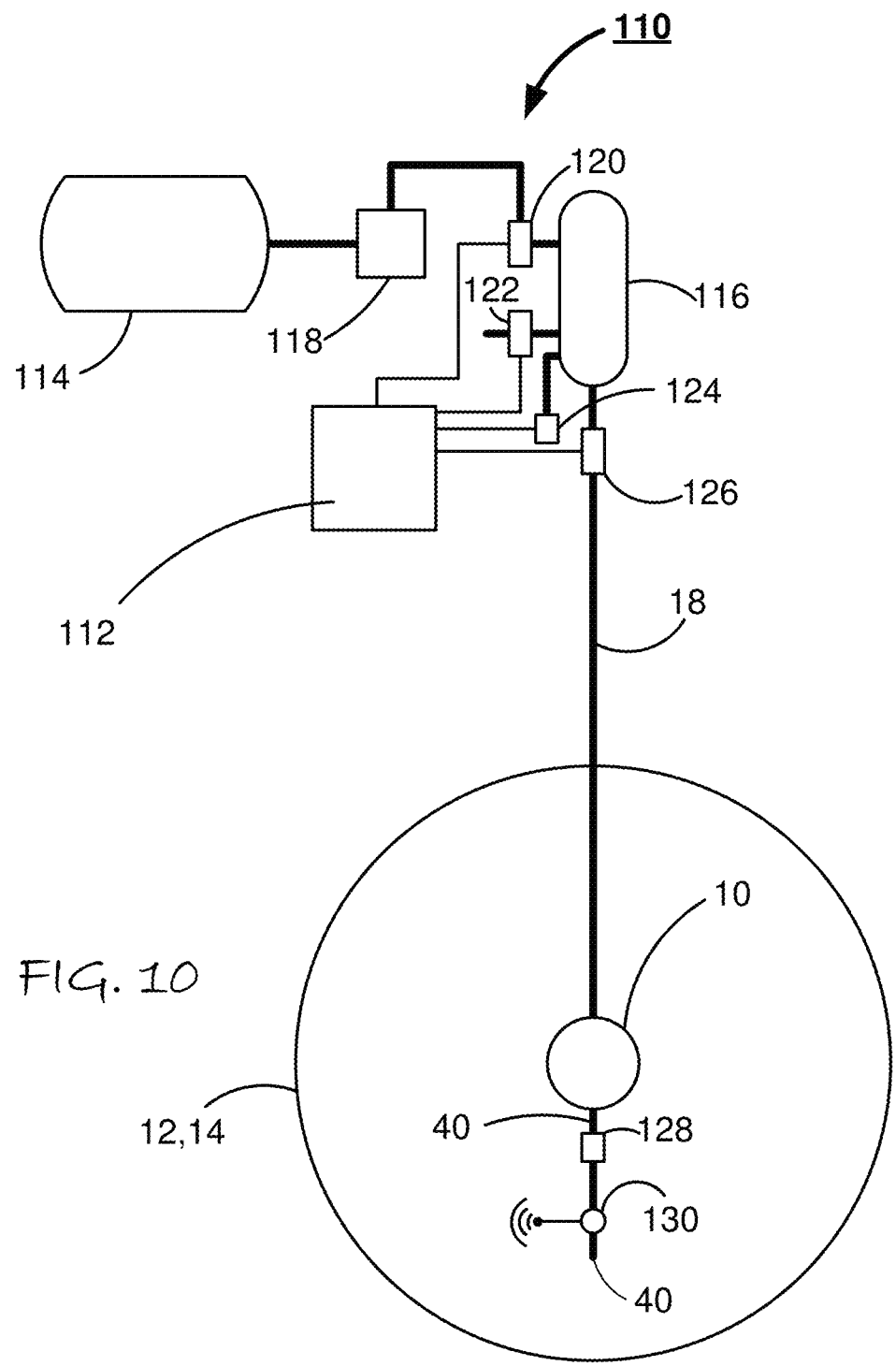
FIG. 10 is a block diagram of the present novel tire pressure management system of FIG. 1.

FIG. 10 shows a tire pressure management system 110, which preferably includes at least a fluid pressure controller 112, which in a preferred embodiment controls the flow of pressurized air into and out of the tires 12 and 14. The source of the pressurized air is a trailer air tank 114. The trailer air tank 114, is in fluidic communication with a tire pressure tank 116. The pressurized air from the trailer air tank 114 passes through an air regulator 118, and then through an air inlet control valve 120, operating under the control of the fluid pressure controller 112. In a preferred embodiment, the tire pressure management system 110, further includes at least: an air outlet valve 122, in fluid communication with the tire pressure tank 116, and under the control of the fluid pressure controller 112; a tire pressure tank pressure gauge 124, in fluid communication with the tire pressure tank 116, and in electronic communication with the fluid pressure controller 112; and an air pressure supply valve 126, in fluid communication with the tire pressure tank 116, and under the control of the fluid pressure controller 112. Preferably, the air pressure supply valve 126, supplies pressurized air to, or conversely, receives pressurized air from the air supply line 18, depending on whether the pressure in the tire (12,14), is above or below a desired pressure level.

In a preferred embodiment, pressurized air that flows into or out of the rotary union 10, is modulated by a dual flow control valve 128. Preferably, the dual flow control valve 128, responds to air pressure supplied by the air supply line 18, by opening a spring loaded valve member, which allows pressurized air to flow out of the tire (12,14), when the pressure in the tire (12,14), is greater than the air pressure in the air supply line 18. Conversely, the dual flow control valve 128, promotes the flow of pressurized air into the tire (12, 14), when the pressure level within the tire 12, 14 is less than the air pressure in the air supply line 18.

FIG. 10 further shows that the tire pressure management system 110, further preferably includes a tire pressure monitoring sensor 130, disposed between the dual flow control valve 128, and the tire (12,14), and in electronic communication with the fluid pressure controller 112. In a preferred embodiment, the tire pressure monitoring sensor 130, measures the level of pressure within the tire (12, 14), and relays the measured pressure level to the fluid pressure controller 112. The fluid pressure controller 112, compares the measured pressure level within the tire (12,14) to a target pressure, maintains the pressure available in the tire pressure tank 116 at the target level, and directs the air pressure supply valve 126, to release pressurized air to the dual flow control valve 128, which activates to promote either inflation, or deflation of the tire (12,14), to bring the pressure level within the tire (12,14) into balance with the target pressure level. Once the desired pressure level within the tire (12, 14) is achieved, as measured by the tire pressure monitoring sensor, the fluid pressure controller 112, directs the air pressure supply valve 126, to disengage.

In a preferred embodiment, the fluid pressure controller 112, operates both the air outlet valve 122, and the air inlet control valve 120, to maintain the pressure within the tire pressure tank 116, at a predetermined pressure level. For example, but not by way of limitation, if the tire pressure of the tires (12, 14) is above the target pressure level, the fluid pressure controller 112, will crack open the air outlet valve 122, to allow relief of pressure from the system; and if the tire pressure of the tires (12, 14) is below the target pressure level, the fluid pressure controller 112, will crack open the air inlet control valve 120, to allow pressure to build in the system.

Figure 11:
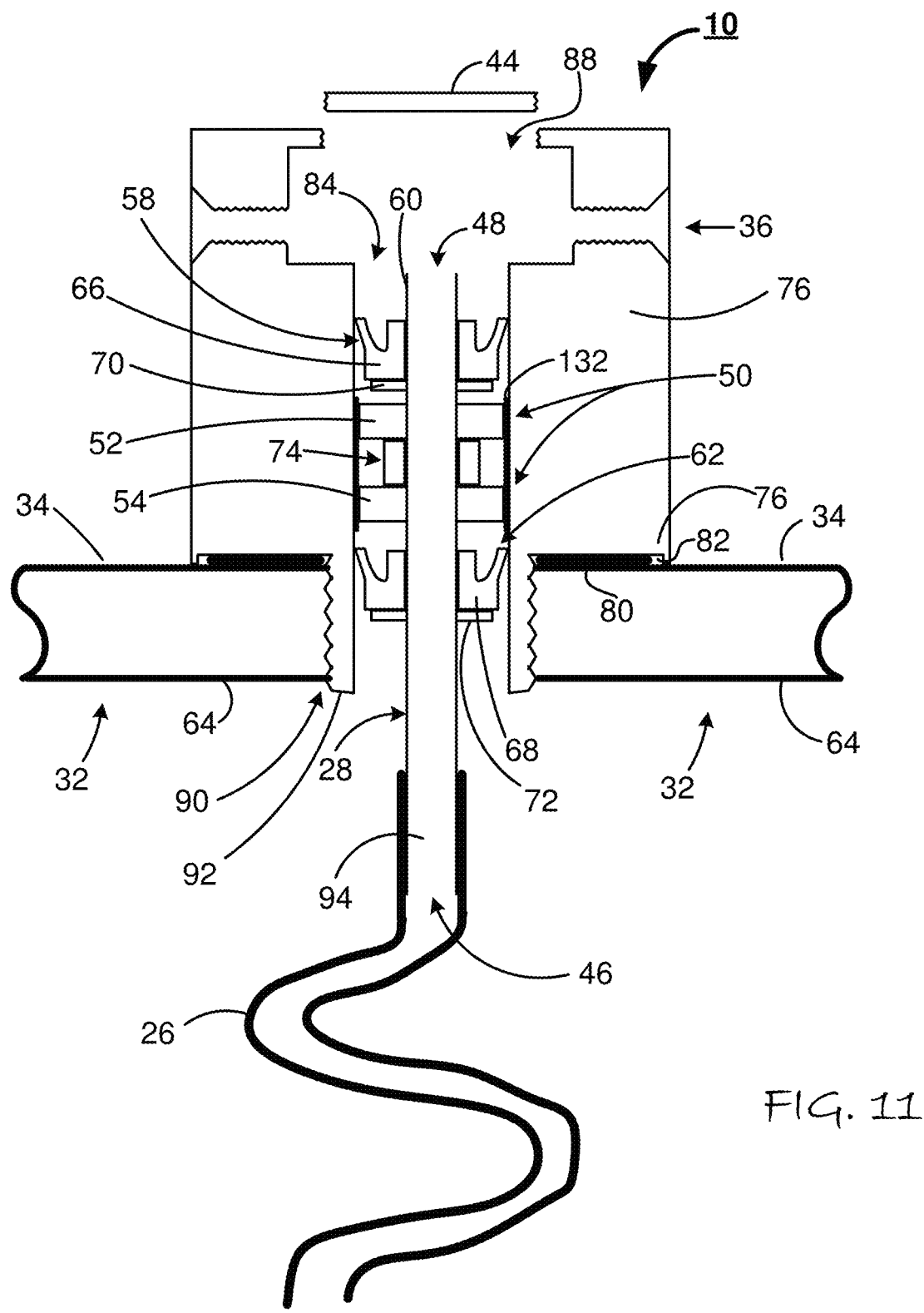
FIG. 11 is a cross-sectional side view of the rotary union housing, air lines, bearing sleeve, and associated seals preferably employed by the present novel tire pressure management system.

FIG. 11 shows a preferred embodiment that preferably includes at least the rotary union housing 76, supporting and confining the fluid conduit 28, within a central bore 84 (also referred to herein as channel 84), of the rotary union housing 76. The fluid conduit 28 preferably provides the downstream end 48 and the upstream end 46. Further shown by FIG. 4 is the pair of bearings 50; each of the pair of bearings 50 provides an inner race and an outer race. Each inner race of the pair of bearings 50, is in pressing communication with the external surface 60, of the fluid conduit 28, and each outer race of the pair of bearings 50, is in pressing communication with a bore surface 86 (also referred to herein as wall 86), of the central bore 84, of the rotary union housing 76. The first bearing 52, of the pair of bearings 50, is adjacent the downstream end 48, of the fluid conduit 28, and the second bearing 54, of the pair of bearings 50, is adjacent the upstream end 46, of the fluid conduit 28.

FIG. 11 further shows that in a preferred embodiment, the rotary union 10 preferably includes a pair of fluid seals 56, the first fluid seal 58, of the pair of fluid seals 56, engages the external surface 60, of the fluid conduit 28, and is disposed between the first bearing 52, and the downstream end 48, of said fluid conduit 28. The second fluid seal 62, of the pair of fluid seals 56, engages the external surface 60 of the fluid conduit 28, and is disposed between said second bearing 54, and the upstream end 46, of the fluid conduit 28. In a preferred embodiment, the first fluid seal 58 provides the base portion 66, and the first fluid seal restraint 70, which is in pressing contact with the external surface 60 of the fluid conduit 28, abuts against the base portion 66, of the first fluid seal 58, to maintain the relative position of the first fluid seal 58, adjacent the bore surface 86, of the central bore 84; and the second fluid seal 62, provides the base portion 68, and the second fluid seal restraint 72, which is in pressing contact with the external surface 60 of the fluid conduit 28, abuts against the base portion 68, of the second fluid seal 62, to maintain the relative position of the second fluid seal 62, adjacent the bore surface 86, of the central bore 84. In a preferred embodiment, the rotary union housing 76 further provides a fluid distribution chamber 88 (also referred to herein as a fluid chamber 88), which is in fluid communication with the downstream end 48, of the fluid conduit 28. The fluid chamber 88, receives pressurized air from the fluid conduit 28, and transfers the received pressurized air to the tires 12 and 14 (of FIG. 1). Additionally, the rotary union housing 76 provides at least the attachment member 92, which preferably is in mating communication with the attachment aperture 90 of the hubcap 32, and further shows that the fluid conduit 28 provides a fluid communication portion 94, which extends beyond the attachment member 92, and into the interior of said hubcap 32.

In a preferred embodiment, the rotary union 10 preferably includes a bearing sleeve 132, and the bearing sleeve 132, is preferably in pressing contact with the central bore 84, or may be joined to the central bore 84, of the rotary union housing 76, by means of the use of an adhesive, weld, solder, or other mechanical joint techniques, such as through an insert molding process.

Preferably, the pair of bearings 50, each provide an inner race and an outer race, each inner race of the pair of bearings 50, is preferably in direct contact adjacency with the external surface 60, of the fluid conduit 28, while the outer race of each of the pair of bearings 50 are preferably in in pressing communication with the internal surface the bearing sleeve 132. The bearing sleeve may be formed from a, composite material; a metallic material (such as, but not limited to brass, aluminum, stainless steel, iron or steel); or from a polymeric materials (such as, but not limited to nylon, Delran™, phenolic, or Teflon™).

As further shown by FIG. 11, an excess pressure collection chamber 82, is provided by the rotary union housing. The excess pressure collection chamber 82, is preferably adjacent the exterior 34, of the hubcap 32, and serves to accommodate a pressure equalization structure 80. The pressure equalization structure 80, is preferably disposed within the excess pressure collection chamber 82, and in contact adjacency with the exterior 34, of the hubcap 32. As is shown in FIGS. 9 and 11, the mechanical configuration of the cooperation between the pressure equalization structure 80, and the excess pressure collection chamber 82 may take on a plurality of forms.

Figure 12:
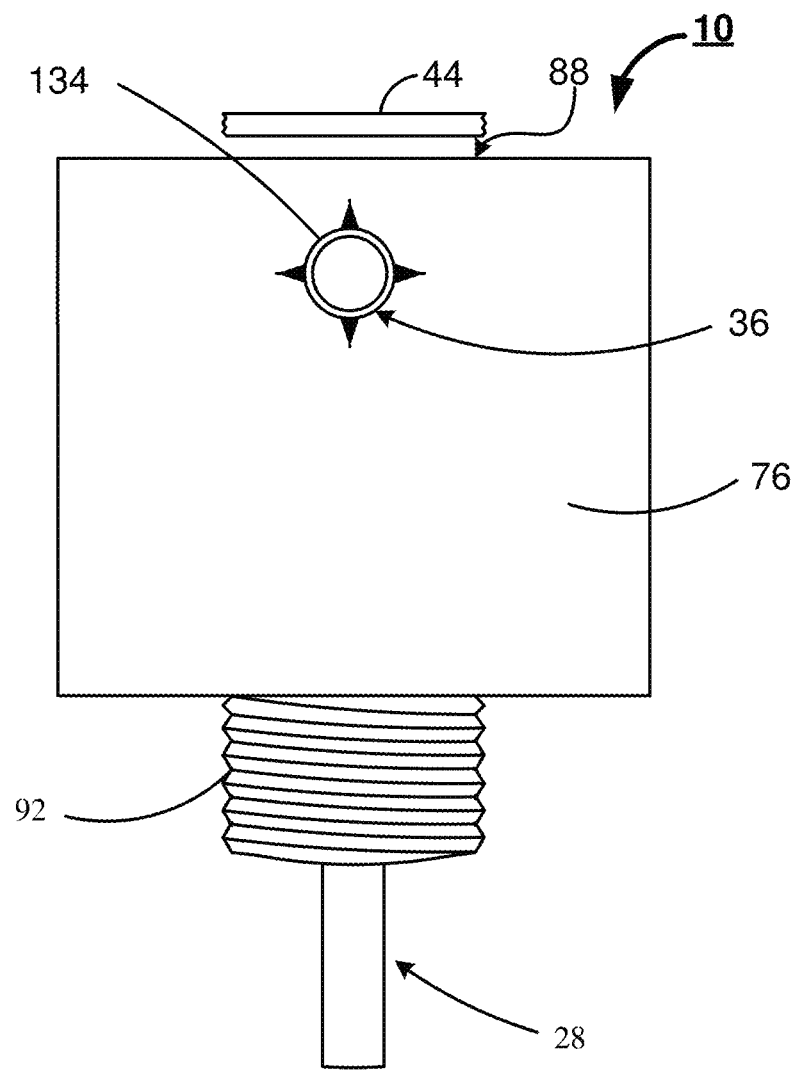
FIG. 12 is a side view in elevation of a rotary union housing formed from a polymer, and providing a threaded insert molded into the polymer rotary housing.

FIG. 12 shows a side view in elevation of a rotary union housing 76, formed from a polymeric materials (such as, but not limited to nylon, Delran™, phenolic, or Teflon™), and providing a threaded insert 134, insert molded into the polymer rotary housing 76, confined within the air delivery channel 36, and in fluidic communication with the fluid chamber 88.

Figure 13:
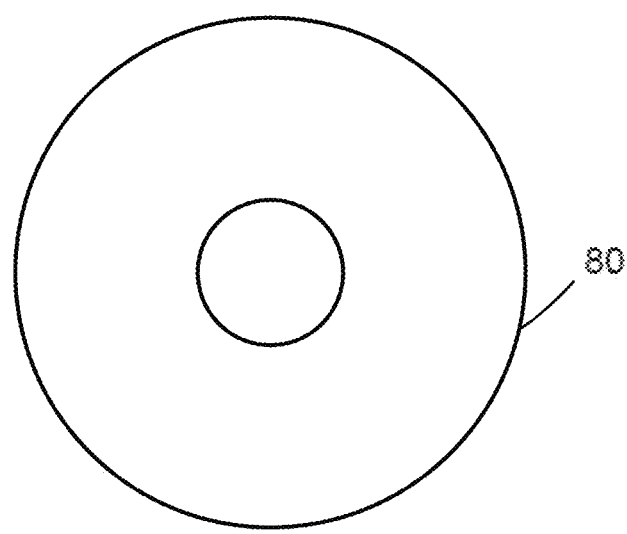
FIG. 13 is a top plan view of a pressure equalization structure of FIG. 11.

FIG. 13 shows a top plan view of the pressure equalization structure 80, of FIG. 11. In a preferred embodiment, of the pressure equalization structure 80 is a filter material (of metal, fiber, or polymer, such as, but not limited to spun bonded polypropylene) as a top layer, and a bottom layer is preferably formed from flashspun high-density polyethylene fibers that promotes the transfer of air, while mitigating the transfer of dirt and water.

Figure 14:
FIG. 14 is a side view in elevation of an embodiment of the pressure equalization structure of FIG. 13.
Figure 15:
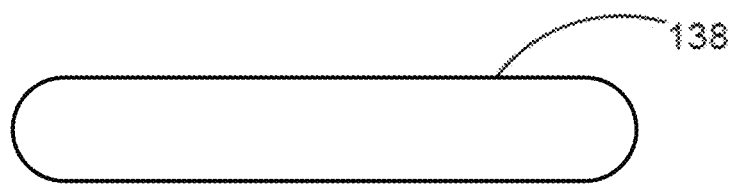
FIG. 15 is a side view in elevation of an alternate embodiment of the pressure equalization structure of FIG. 13.
Figure 16:
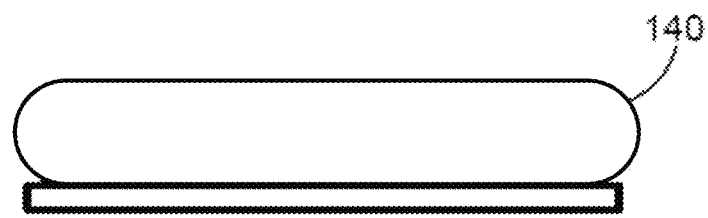
FIG. 16 is a side view in elevation of an alternative embodiment of the pressure equalization structure of FIG. 13.

FIG. 14 shows a side view in elevation of a preferred component of the bottom layer 136, of the pressure equalization structure 80, of FIG. 13. While FIG. 15 shows a side view in elevation of a preferred component of the top layer 138, of the pressure equalization structure 80, of FIG. 13. And FIG. 16 shows a side view in elevation of a combination 140, of the preferred bottom layer 136, applied to an external surface of the top layer 138.

Figure 17:
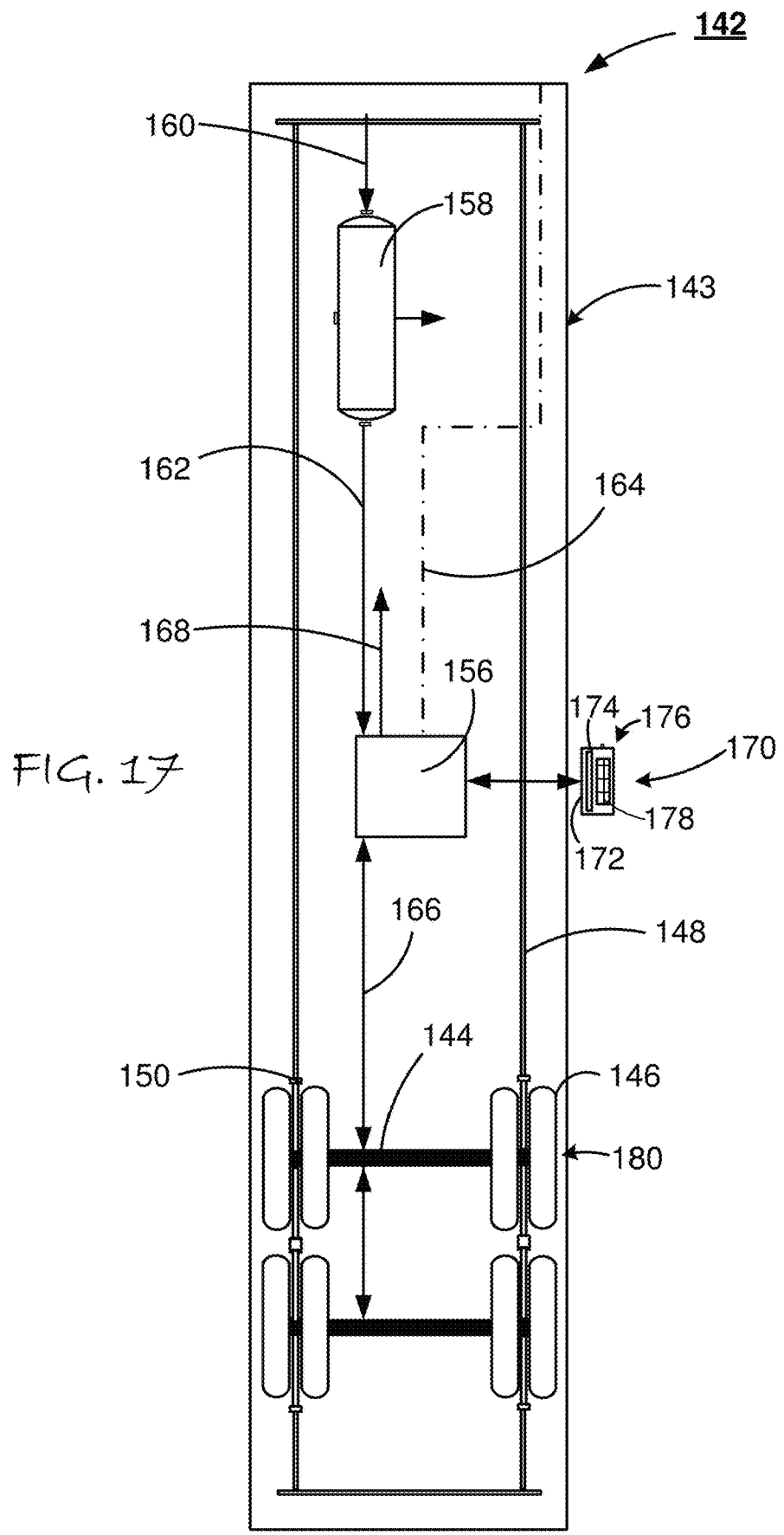
FIG. 17 is a bottom plan view of a trailer, featuring a leaf spring suspension.

FIG. 17 shows a bottom view of a dynamic wheel management system ("DWMS") 142, of the present subject matter. In a preferred embodiment, the DWMS 142 includes at least a trailer 143, supported by an axle 144, the axle 144, housing a pressurized fluid, and supported by a tire 146, and a vehicle frame 148, supported by the axle 144. In a preferred embodiment, a suspension 150, is disposed between and secured to each the vehicle frame 148, and the axle 144. The suspension may take the form of an air suspension system 152 (of FIG. 18), or a leaf spring suspension 154 (of FIGS. 19 and 20).

In a preferred embodiment the DWMS 142, further include: a pressure management controller 156, supported by the vehicle frame 148, and communicating with the tire 146; a load detection device 158 (of FIGS. 19 and 20), interacting with the suspension 150, and communicating with the pressure management controller 156. A further element of the preferred embodiment is a hubcap 32, (of FIG. 11), which is preferable supported by the axle 144, and has an interior 64, and an exterior 34. Preferably, the DWMS 142, further include a rotary union 10 (of FIG. 1), axially aligned with the axle 144, and mounted to the hubcap 32, from the exterior 64, of the hubcap 32. The rotary union 10, preferably including at least a rotary union housing 76 (of FIG. 6). The rotary union housing 76, provides at least a fluid distribution chamber 88 (of FIG. 6), and a central bore 84. The central bore 84, providing an internal surface and a portion of the fluid distribution chamber 88.

FIG. 17 further shows a fluid supply tank 158, which preferably receives a pressurized fluid from a compressor by way of the fluid supply line 160. Preferably, the fluid supply tank 160 provided fluid to the pressure management controller 156, by way of a system supply line 162, and power is supplied to the pressure management controller 156 by way of a power line 164 (also referred to herein as a power circuit 164). The pressure management controller 156, preferably manages a fluid pressure in the tire 146 through use of a fluid line 166, which supports a bidirectional fluid flow between the tire 146, and when necessitated, relives tire pressure to the atmosphere through exhaust line 168.

FIG. 17 further shows a system programming device 170, in communication with the pressure management controller 156. In a preferred embodiment, but not by way of a limitation, the system programming device 170, provides: an information input/output circuit 172, which is used to communicate with the pressure management controller 156; an information display screen 174, interacting with the information input/output circuit 172; and an information input device 176, which may be, but is not limited to, a keyboard 178, or a memory information device 180, such as a memory stick.

Figure 18:
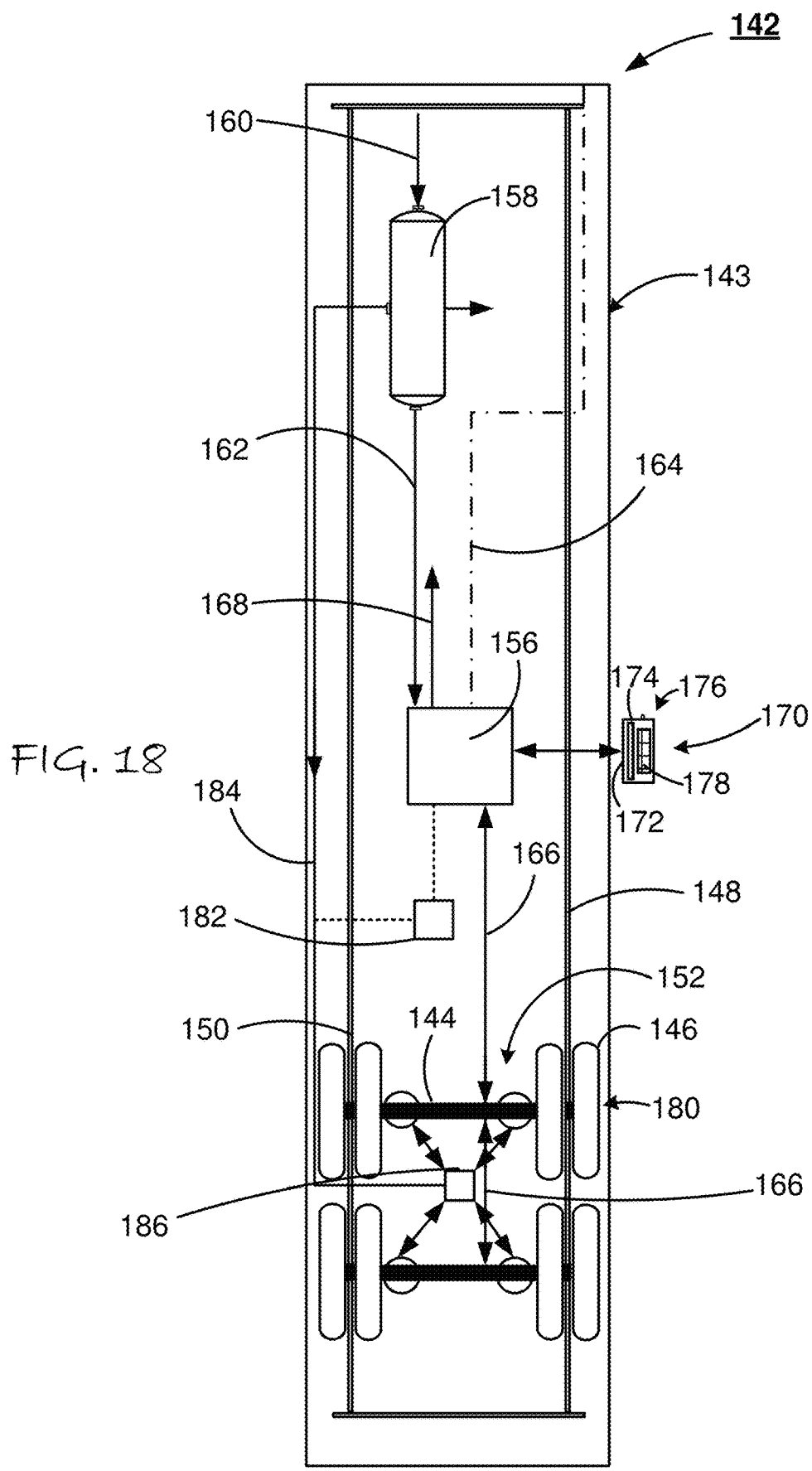
FIG. 18 is a bottom plan view of a tractor trailer, featuring an air bag suspension.

FIG. 18 shows a bottom view of a dynamic wheel management system ("DWMS") 142, of the present subject matter. It differs from FIG. 17 in that it shows an inclusion of a temperature/pressure transducer 182, disposed between, and communicating with, a suspension fluid supply line 184, and an air suspension control device 186. The suspension fluid supply line 184, supplying a fluid to the air suspension control device 186, from the fluid supply tank 158.

Figure 19:
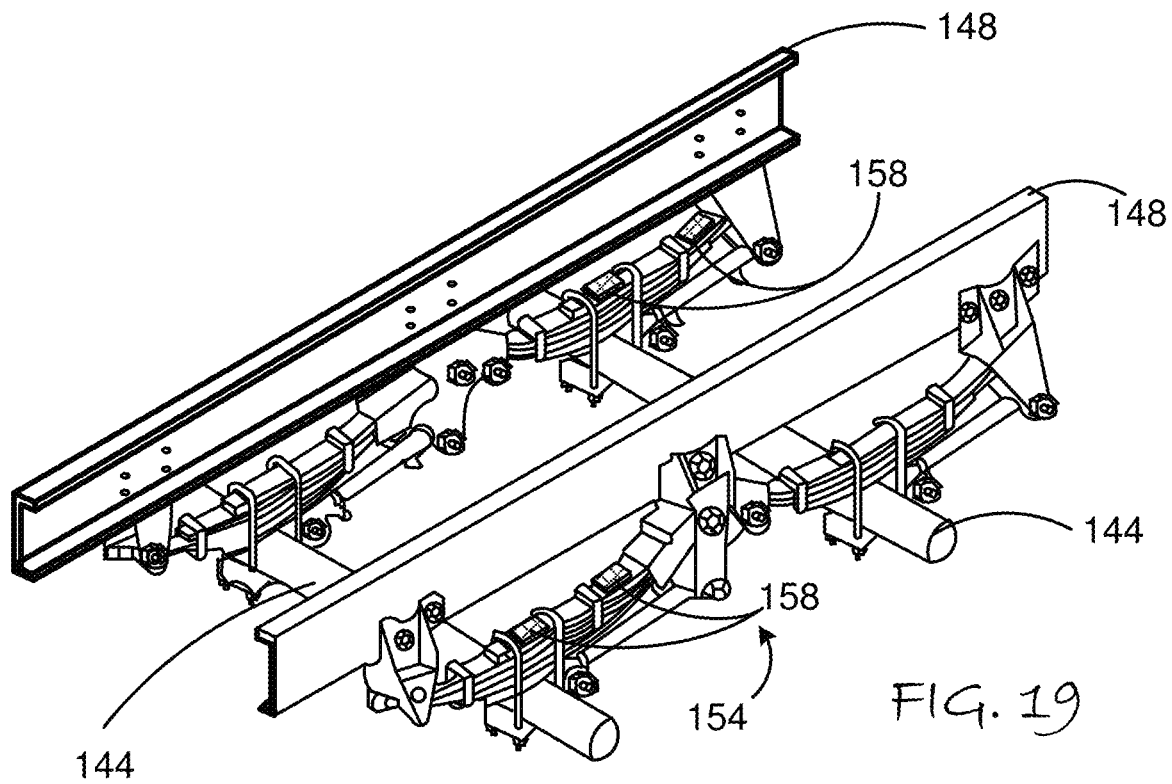
FIG. 19 is a partial view in perspective of the trailer of FIG. 17, showing the leaf springs outfitted with strain gauges.
Figure 20:
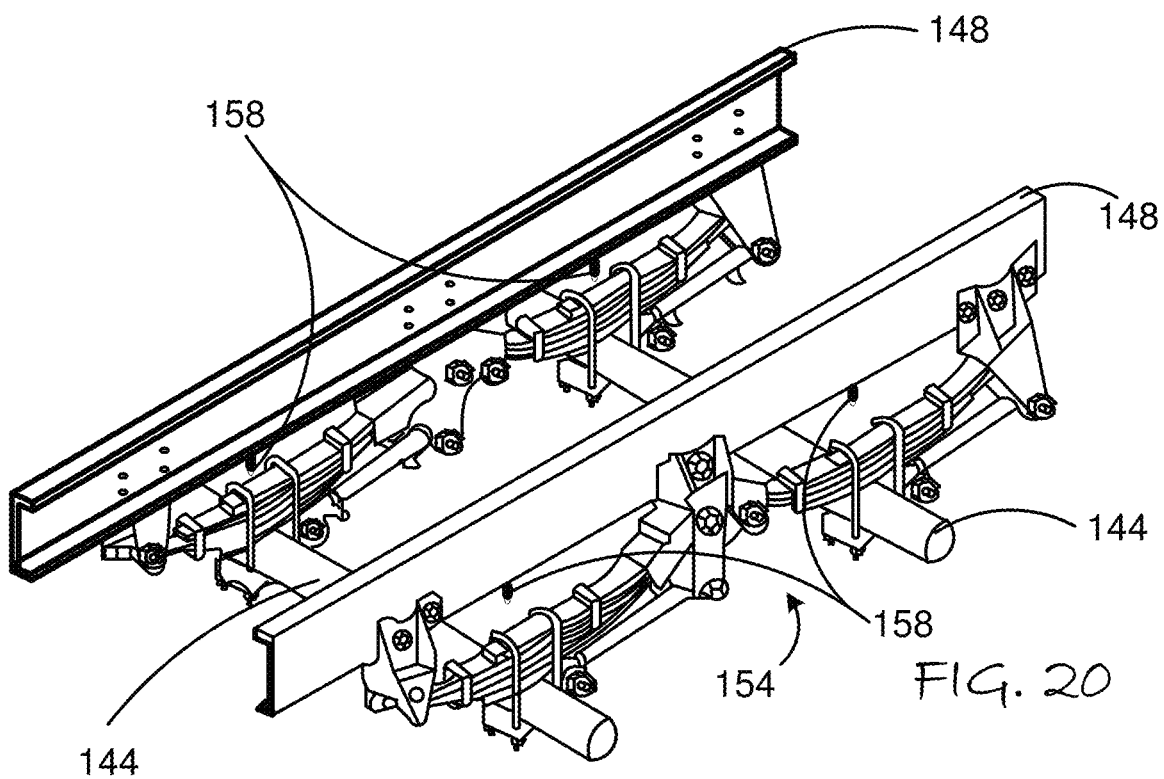
FIG. 20 is a partial view in perspective of the trailer of FIG. 17, showing the leaf springs outfitted with proximity sensors.

FIGS. 19 and 20 show the vehicle frame 148, supported by the axle 144 by way of the suspension 154, and a load detection device 158, which as shown by FIG. 19, is preferably a strain gauge secured to a leaf spring type suspension, and as shown by FIG. 20, the load detection device 158 is a proximity sensor. The proximity sensor, without limitations, may be selected from inductive, capacitive, magnetic, ultrasonic, and photoelectric type sensors. In a preferred embodiment, the proximity sensors are secured to the vehicle frame 148, and communicate with the leaf spring suspension.

Figure 21:
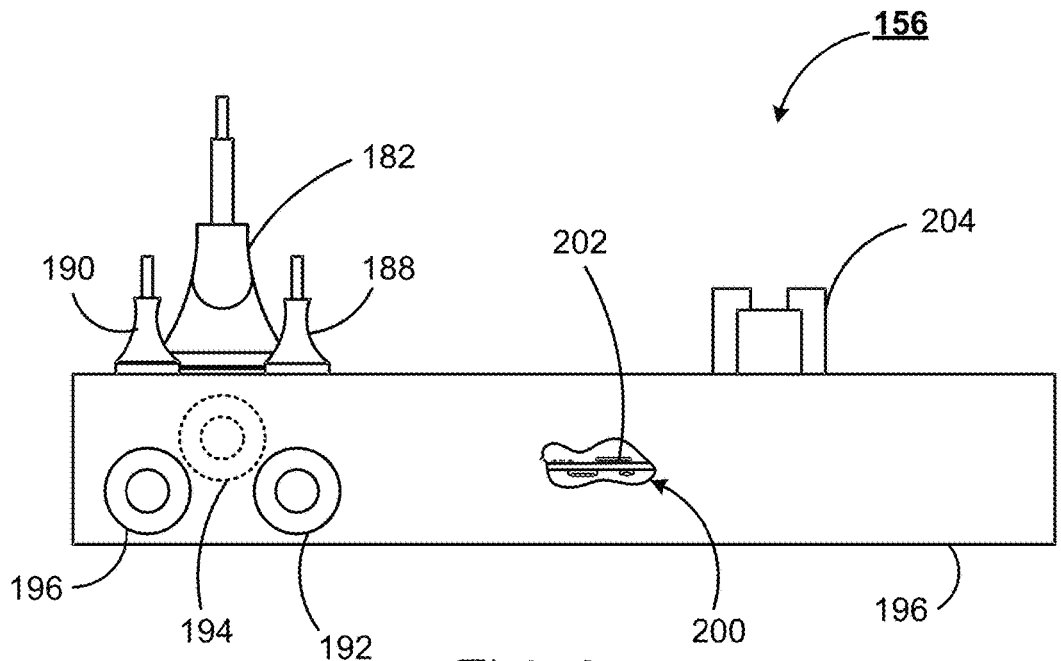
FIG. 21 is a partial cutaway a view in elevation of a pressure management controller of the present dynamic wheel management system.

FIG. 21, shows the pressure management controller 156, which preferably includes the temperature/pressure transducer 182, a pair of pneumatic piston valves 188 and 190. Pneumatic piston valve 188, cooperates with, and is disposed between, a fluid inlet port 192, and a fluid inflate and deflate port 194 (shown in dashed lines, as the fluid inflate and deflate port 194 is on an opposite side of a confinement structure 196 {also referred to herein as a housing 196}, than is the fluid inlet port 192). The fluid inflate and deflate port 194 interacts with the tire 146 to either provide fluid to the tire 146, when the tire 146 requires inflation, or when the tire requires deflation, to maintain the tire pressure at a desired value.

Pneumatic piston valve 190, cooperates with, and is disposed between, a fluid exhaust port 198, and the fluid inflate and deflate port 194. When a deflation of tire 146 is needed to maintain the fluid pressure at a desired level, fluid from the tire 146 flows through the fluid inflate and deflate port 194, and the pneumatic piston valve 190, to the exhaust port 198, where it is released to atmosphere.

FIG. 21 further shows that the housing 196, further houses a control electronics assembly 200, which receives input from the temperature/pressure transducer 182, and utilizes that input, in conjunction control logic loaded into a central processing unit ("CPU") 202 to manage the pressure in the tire 146, to maintain the fluid pressure within the tire 146, at the desired level. In a preferred embodiment, control logic contained within the CPU 202, is provided by the system programming device 170 (of FIG. 12).

The housing 196, further preferably supports a power/data/controller area network ("CAN") connector 204. The power/data/CAN connector 204, preferably receives power from the power line 164 (of FIG. 12), receives input from the system programming device 170, when the system programming device 170 is communicating with the CPU 202, and provides output data from the CPU 202 by way of the CAN connection of the power/data/CAN connector 204.

Figure 22:
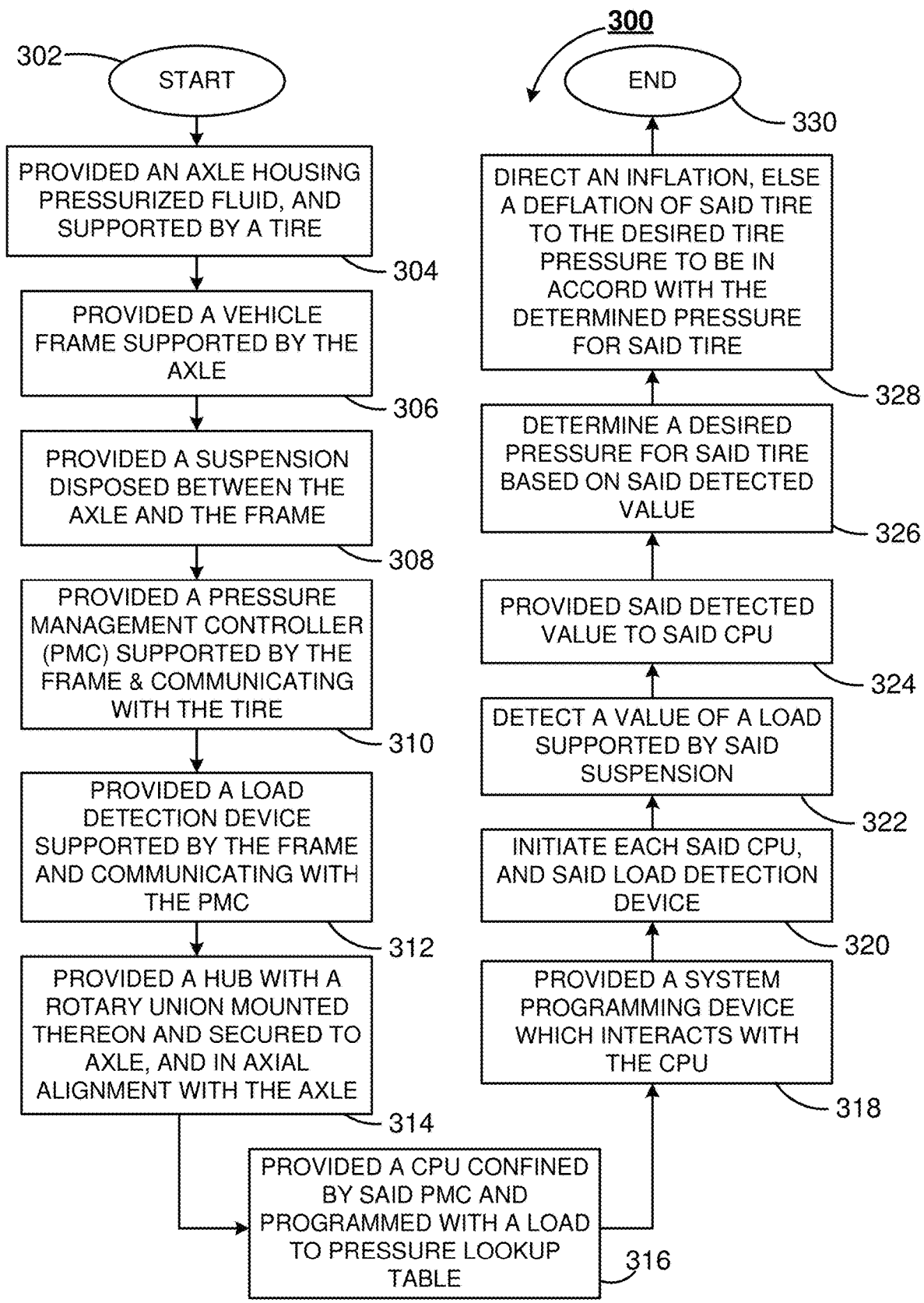
FIG. 22 is a flow diagram of a method of using the present dynamic wheel management system.

FIG. 22, is a flow diagram 300, of a method of using the present dynamic wheel management system 142 (of FIG. 17). The method begins at start step 302, and continues process step 304, at which an axle (such as 16, of FIG. 1) is provided. The axle (such as 144 of FIG. 17), preferably supported by an frame (such as 148 of FIG. 17), houses a pressurized fluid, in which the axle itself may confine the pressurized fluid, or the axle may house an air supply line (such as 18, of FIG. 1) that in turn confines the pressurized fluid. The axle is preferably supported by a tire (such as 146, of FIG. 17. At process step 304, a vehicle frame (such as 148, of FIG. 17) is provided, which in a preferred embodiment, is supported by the axle, and at process step 306, a suspension (such as air suspension system 152 (of FIG. 18), or a leaf spring suspension 154 (of FIGS. 19 and 20)) is provided. In a preferred embodiment, the suspension is disposed between the vehicle frame and the axle.

At process step 310, a pressure management controller ("PMC") (such as 156, of FIG. 18) is provided. In a preferred embodiment, the PMC is supported by the frame and communicates with the tire. While at process step 312, a load detection device (such as 154, of FIGS. 19 and 20) is provided. Preferably, the load detection device is supported by the frame, detects changes in the suspension, which is in response to loads being placed in the vehicle, and communicates those changes to the CPU, which is provided in process step 315, and is preferably confined by the PMC. The CPU analyses the communication from the load detection device and determines a desired pressure for the tire.

At process step 314, a hub, with a rotary union (such as 10, of FIG. 11) mounted thereto, is provided. In a preferred embodiment, the hub is mounted to the axle, and the rotary union is preferably positioned in axial alignment with the axis of the axle. At process step 318, a system programming device (such as 170, of FIG. 18) is provides. In a preferred embodiment, the system programming device is, when connected to the PMC, is utilized to up load operational software, and data used by the PMC during active operation of the PMC.

At process step 320, both the CPU and the load detection device is initiated. At process step 322, the load detection device determines the condition of the suspension, and generates a value. And at process step 324, the load detection device provides that value to the CPU. Again, the value provided is reflective of a load being supported by the suspension. At process step 326, the CPU determines a pressure value for use in the tire, based on the value detected and provided by the load detection device.

At process step 328, the PMC directs an inflation else a deflation of the tire to the desired pressure level for the tire, based on and in accordance with, the determined pressure value, and the process concludes at end process step 330.

Figure 23:
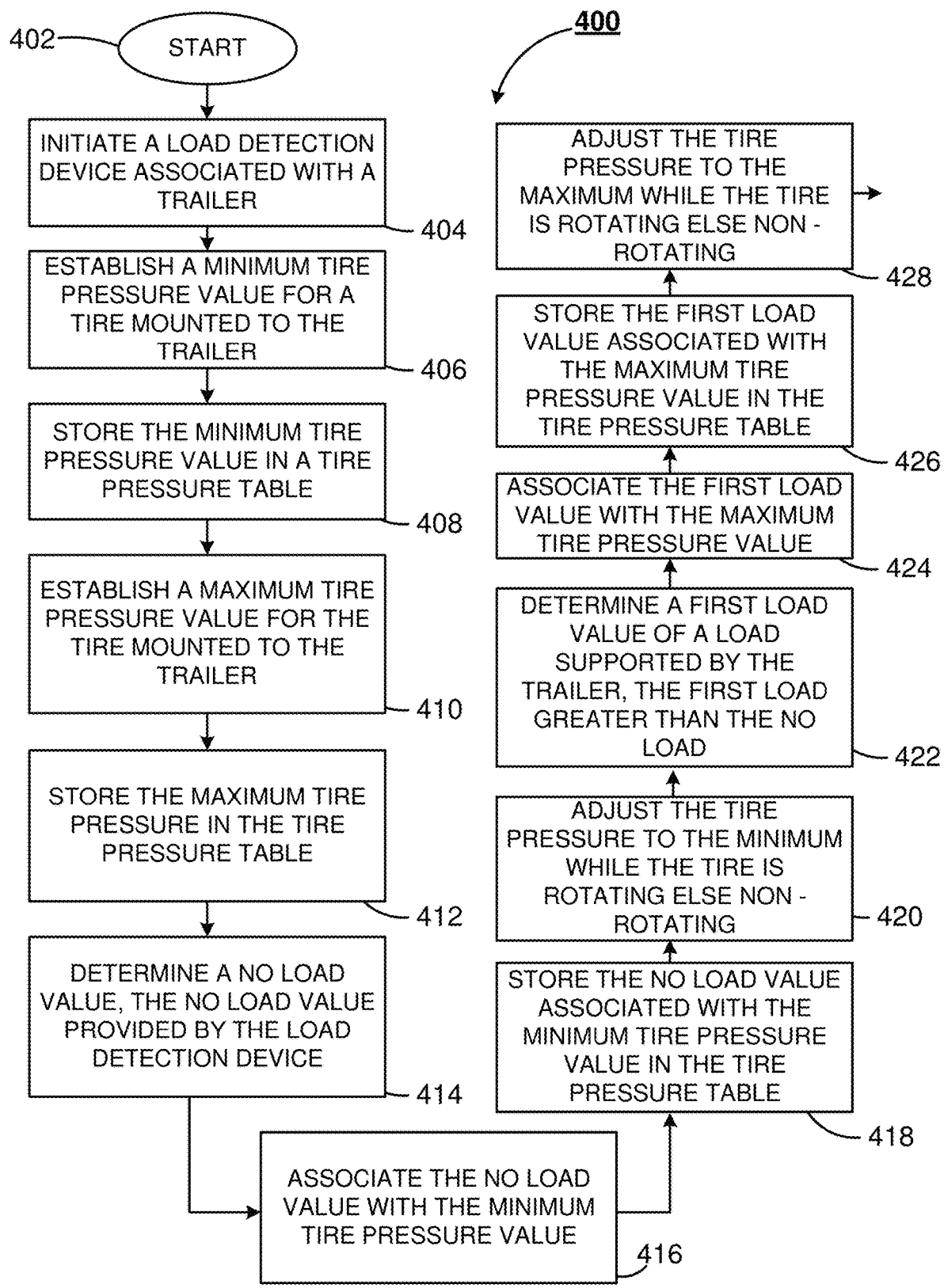
FIG. 23 is a flow diagram of a method of producing and using a tire pressure table of the present dynamic wheel management system.
Figure 24:
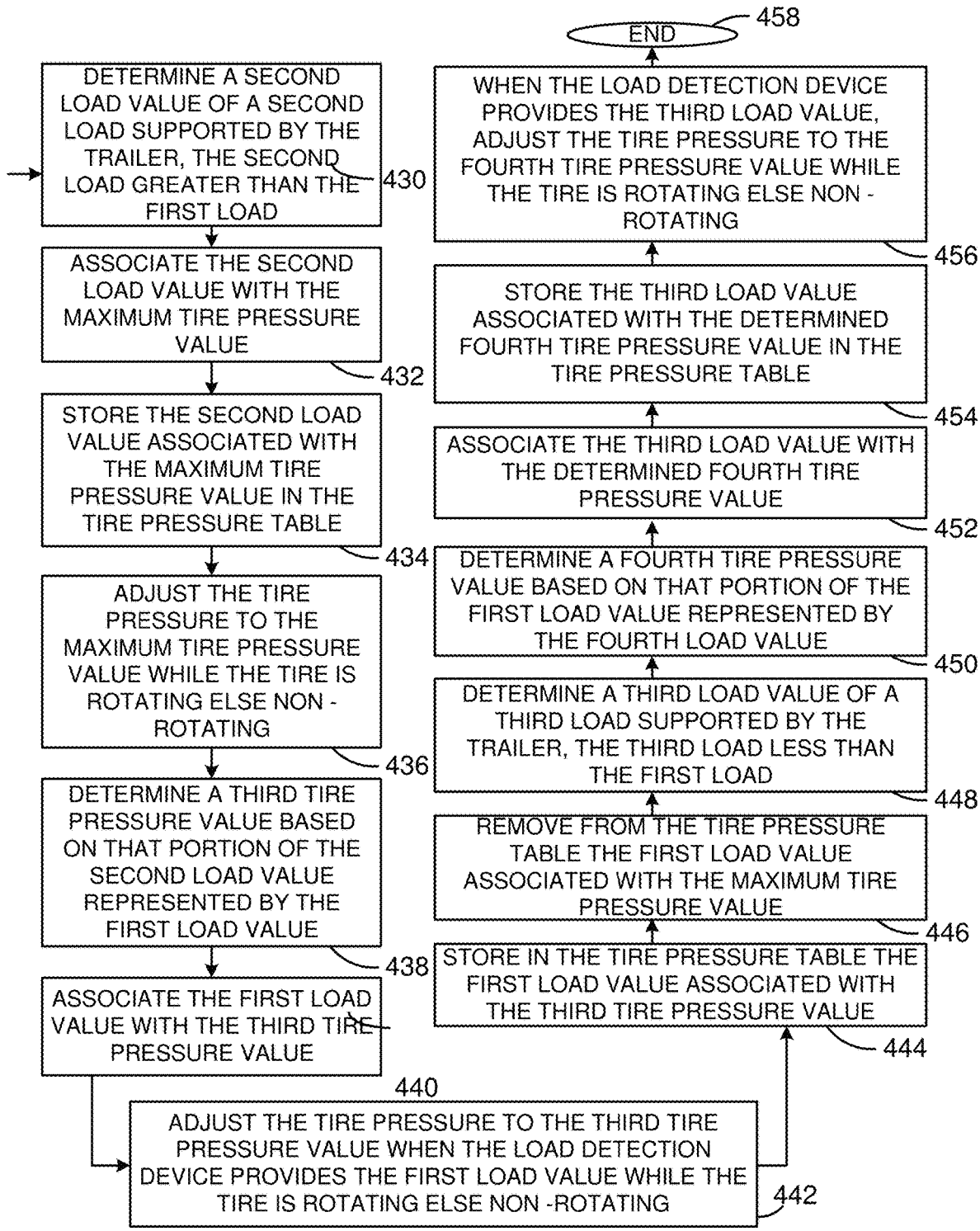
FIG. 24 is continuation of the flow diagram of a method of producing and using a tire pressure table of the present dynamic wheel management system of FIG. 23.

FIGS. 23 and 24, show a flow diagram of a process 400, of using the present dynamic wheel management system ("DWMS") (such as 142, of FIGS. 17 and 18). Process 400 commences at start step 402, and continues with process step 404. At process step 404 a load detection device associated with a vehicle (also referred to herein as trailer, of DWMS 142).

The process preferably continues at process step 406, a minimum tire pressure value is established for a tire mounted to the trailer. At process step 408, the minimum tire pressure is stored in a tire pressure table (also referred to herein as a tire table) contained within a CPU (such as 202, of FIG. 21), confined within a housing (such as 196, of FIG. 21), of a PMC (such as 156, of FIG. 21). At process step 410, a maximum tire pressure value for the tire is established, and stored in the tire table contained within the CPU at process step 412.

At process step 414, a no load value is determined by the load detection device, and associated with the minimum tire pressure value in the tire table at process strep 416, and further stored within the tire table at process step 418. At process step 420, the tire pressure is adjusted to comply with the minimum tire pressure when the no load value is provided to the CPU. Adjustment of the tire pressure may occur while the tire is rotating, or non-rotating.

At process step 422 a first load value, reflective of a first load being loaded on the trailer and supported by the suspension of the trailer, is determined, wherein the first load is greater in weight than the no load condition. At process step 424, the first load value is associated with the maximum tire pressure value, stored in the tire table of the CPU at process step 426, and at process step 428, the tire pressure is adjusted to comply with the maximum tire pressure when the first load value is provided to the CPU. Adjustment of the tire pressure may occur while the tire is rotating, or non-rotating.

The process continues with process step 430, of FIG. 24. At process step 430, a second load value is determined for a second load supported by the trailer, in which the second load is greater than the first load. At process step 432, the second load value is associated with the maximum tire pressure value, stored in the tire table at process step 434, and at process step 436, the tire pressure is adjusted to comply with the maximum tire pressure when the second load value is provided to the CPU. Adjustment of the tire pressure may occur while the tire is rotating, or non-rotating.

At process step 438, a third tire pressure is calculated by the CPU, based on that portion of second load value represented by the first load value. At process step 440, the first load value is associated with the determined third tire pressure value, stored in the tire table at process step 444, and at process step 442, and at process step 442 the tire pressure is adjusted to comply with the determined third tire pressure value, when the load detected by the load detection device provides the first load value to the CPU. Adjustment of the tire pressure may occur while the tire is rotating, or non-rotating. And at process step 446, the first load value associated with the maximum tire pressure is removed from the tire table.

At process step 448, a third load value of a third load is determined, wherein the weight of third load is less than the first load. At process step 450, a fourth tire pressure value, based on that portion of the first load value represented by the fourth load value, is determined by the CPU. At process step 452, the third load value is associated with the determined fourth pressure value, stored in the tire table at process step 454, and at process step 456, the tire pressure is adjusted to comply with the determined fourth tire pressure value, when the load detected by the load detection device provides the third load value to the CPU. Adjustment of the tire pressure may occur while the tire is rotating, or non-rotating. And the process concludes at process step 458.

Figure 25:
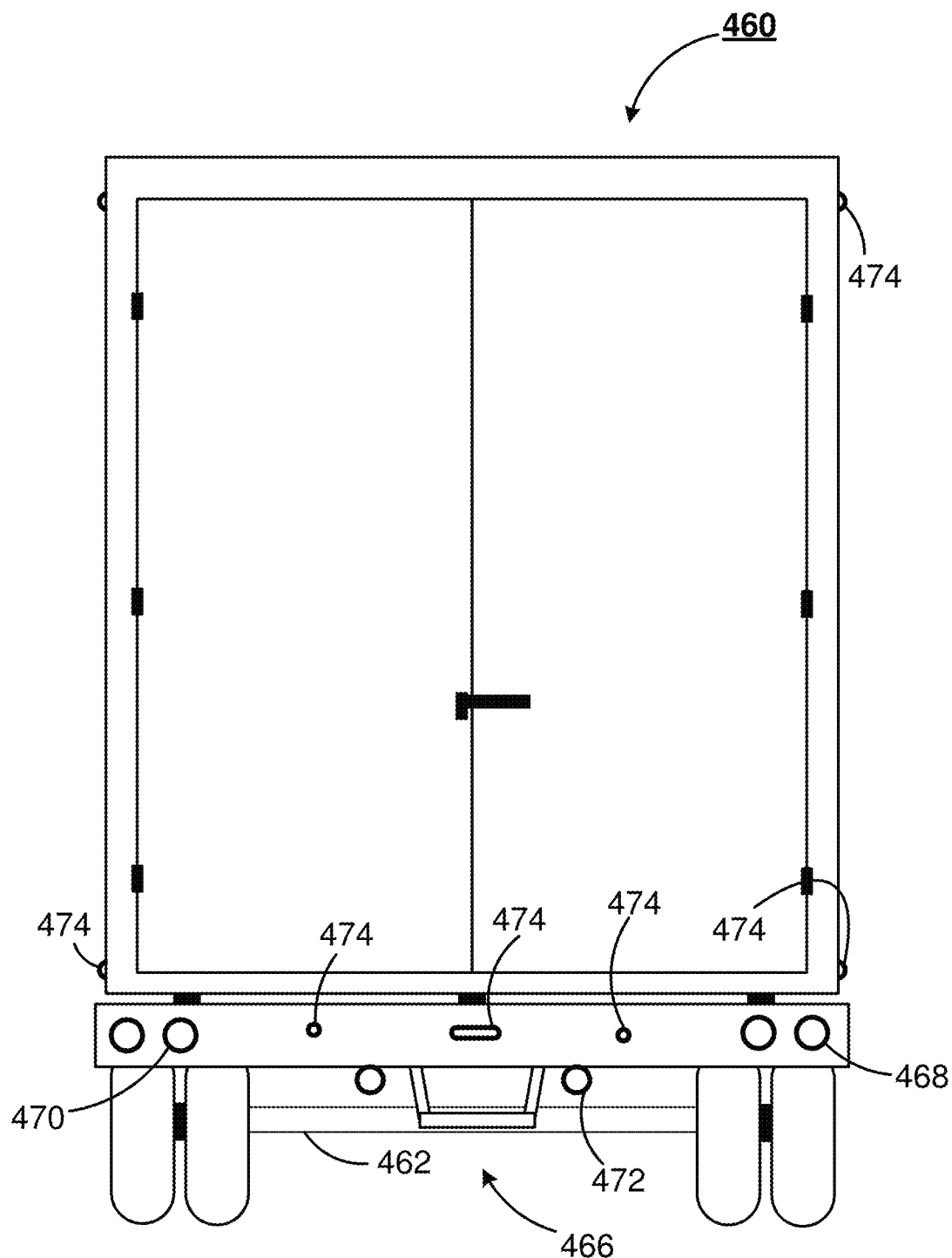
FIG. 25 is a rear view in elevation of a semi-trailer.

FIG. 25 shows a rear view in elevation of a semi-trailer 460 (also referred to herein as a cargo transport unit 460), which preferably includes at least an axle 462, supporting a vehicle frame 148, a suspension 152 (of FIG. 18), or a leaf spring suspension 154 (of FIGS. 19 and 20), disposed between and secured to each the vehicle frame 148, and the axle 462. FIG. 25, further shows a load detection device 158 (of FIGS. 19 and 20), interacting with the suspension (152, 154), and communicating with a system controller 464 (of FIG. 26), the system controller 464 is preferable supported by the vehicle frame 148.

Still further, FIG. 25 shows a vehicle operational lighting system 466, supported by the frame 148, and communicating with the system controller 464. The vehicle operational lighting system 464, is activated by the system controller 464, in response to load detection data received by the system controller 464, from the load detection device 158. In a preferred embodiment, the vehicle operational lighting system 466, includes at least a brake light 468, supported by the vehicle frame 148, a turn signal 470, supported by the vehicle frame 148, and a backup light 472, supported by the vehicle frame 148. Additionally, FIG. 25 shows a running light 474, supported by the vehicle frame 148, wherein the operational condition of each the brake light 468, turn signal 470, backup light 472, and running light 474 is verified, to be functioning properly by the system controller 464.

In a preferred embodiment, the running light 474, is flashed by the system controller 464, when a load supported by the vehicle frame 148, is detected, by the load detection device 158, to impart an imbalance condition on the suspension (152, 154). In an alternate preferred embodiment, the backup light 472, is flashed by the system controller 464, when a load supported by the vehicle frame 148, is detected, by the load detection device 158, to impart an imbalance condition on the suspension (152, 154). In an alternative preferred embodiment, the turn signal 470, is flashed by the system controller 464, when a load supported by the vehicle frame 148, is detected, by the load detection device 158, to impart an imbalance condition on the suspension (152, 154). In an alternate, alternative embodiment, the brake light 468, is flashed by the system controller 464, when a load supported by the vehicle frame 148, is detected, by the load detection device 158, to impart an imbalance condition on the suspension (152, 154).

It will be recognized by those skilled in the art, that any combination of the brake light 468, turn signal 470, backup light 472, and running light 474 may be used in unison, or in any combination, to inform the condition the load imparts on the suspension (152, 154), i.e., weather the load is improperly fore or aft, port or starboard, relative to the suspension (152, 154).

Figure 26:
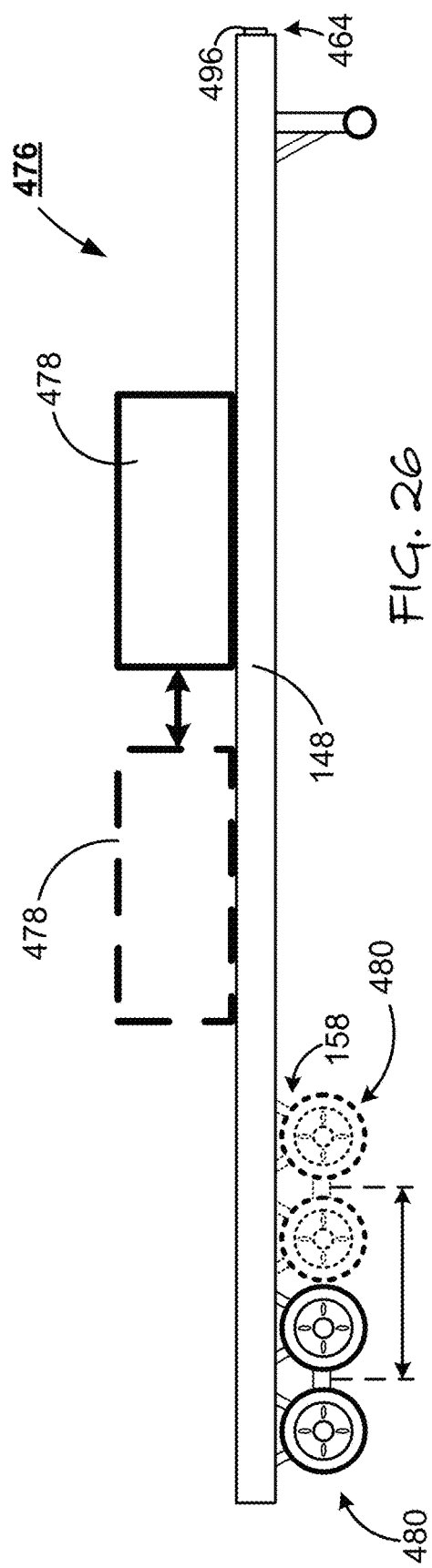
FIG. 26 is a side view in elevation of a flatbed semi-trailer.

FIG. 26 shows an embodiment of a side view, in elevation, of a flatbed semi-trailer 476, having the vehicle frame 148, supporting a load 478, and the vehicle frame 148, supported by a tire, wheel, axle, and suspension assembly 480 (also referred to as suspension assembly 480). In this embodiment, the load 478, an imbalance load condition may be resolved by shifting the load 478, relative to the suspension assembly 480, (such as shifting the load 478 in the direction of the suspension assembly 480, as shown by FIG. 26). Or, by repositioning the suspension assembly 480, relative to the load 478, (such as repositioning the suspension assembly 480, in the direction of the load 478, as shown by FIG. 26).

Figure 27:
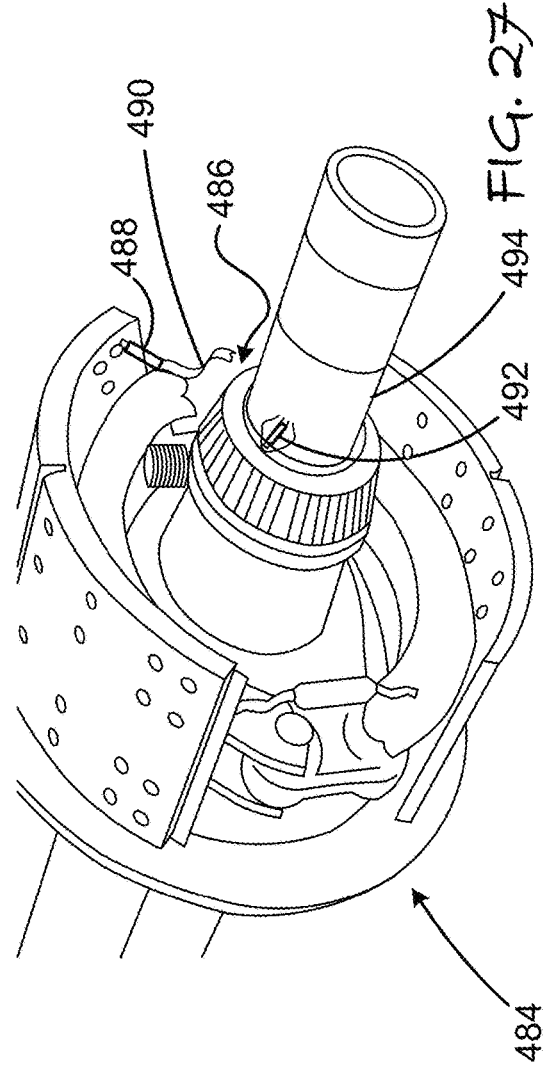
FIG. 27 is a perspective view of an axle with accompanying brake assembly, and bearing of the semi-trailer of FIG. 25.

FIG. 27 shows a perspective view of an axle 482, with accompanying brake assembly 484, and bearing 486, of the suspension assembly 480, of the flatbed trailer semi-trailer 476, of FIG. 26. In a preferred embodiment a sensor 488, attached to a communication line 490, and positioned adjacent the brake assembly 484, detects a condition of the break assembly 484, and relays that detected condition to the system controller 464 (of FIG. 26). The preferred embodiment further shows a sensor 492, positioned adjacent the bearing 486, and attached to a communication line 494, detects a condition of the bearing 486, and relays that detected condition to the system controller 464 (of FIG. 26). Preferably, the condition being detected by each sensor (488, 492) is heat. However, other conditions could include vibration, and of the ware of the components. For example, the sensor 488, can be incorporated in the brake shoe, to detect an amount of ware sustained by the brake pad.

Figure 28:
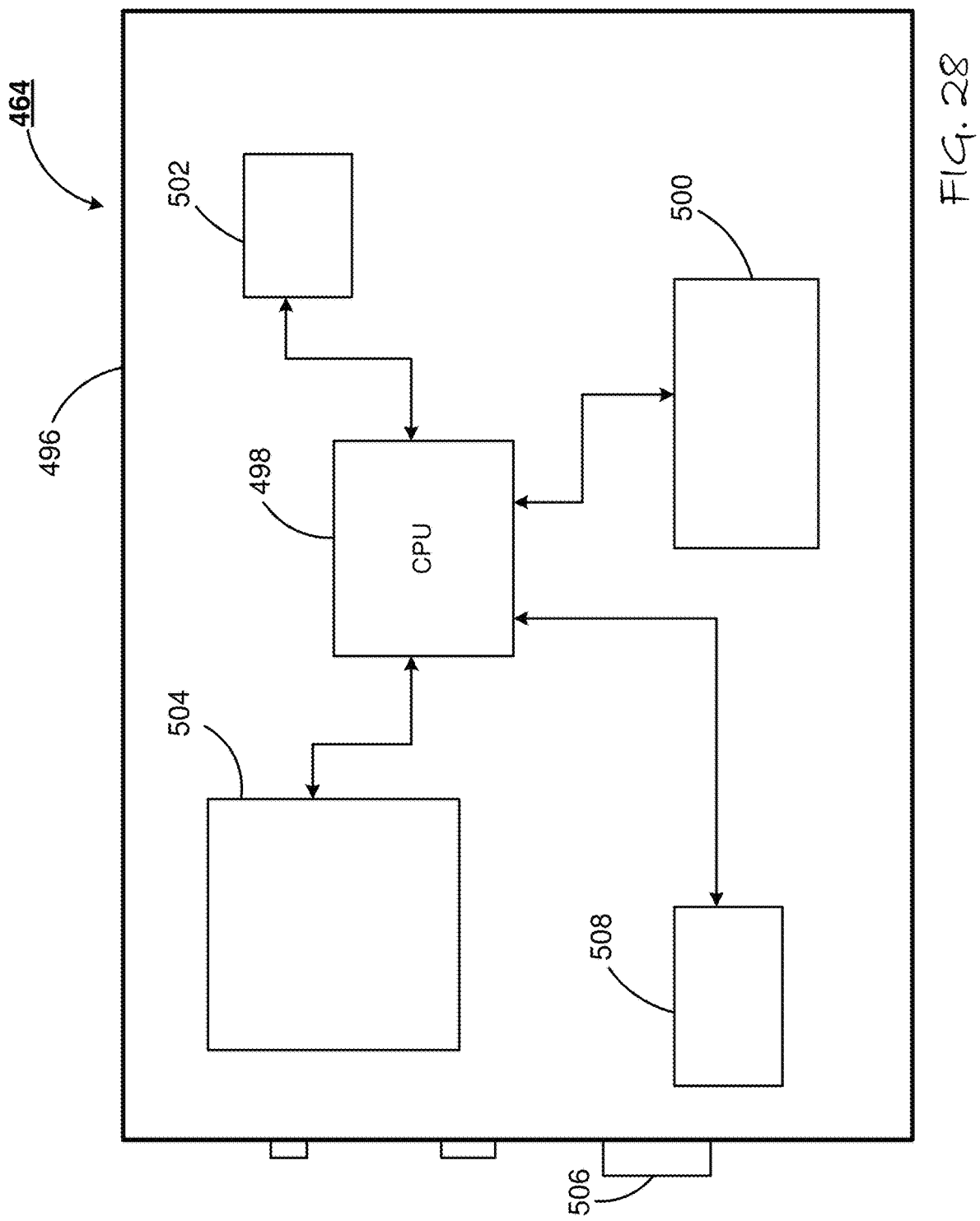
FIG. 28 is block diagram of a system controller of the semi-trailer of FIG. 26.

FIG. 28 illustrates a block diagram of the system controller 446, of the flatbed semi-trailer 476, of FIG. 26. In a preferred embodiment, the system controller 464, includes at least, but is not limited to, a system controller housing 496, (of FIG. 26) supported by the vehicle frame 148 (of FIG. 26), and housing a central processing unit ("CPU") 498. FIG. 28, further shows: a modem 500, confined within the controller housing 496, and communicating with the CPU 498; controller area network support electronics ("CAN") 502, confined within the controller housing 496, and communicating with the CPU 498; a wireless communication circuit 504, confined within the controller housing 496, and communicating with the CPU 498; a communication interface connector 506, supported by the controller housing 496, and communicating with the CPU 498; and a global positioning system 508, confined within the controller housing and communicating with the second CPU.

In a preferred embodiment, the system controller 464, is an embedded ARM computer with built-in connectivity to the Cloud and the Pneumatics & Sensors on the Truck and/or Trailer. The System controller 464 performs several critical functions such as device connectivity (Cloud, Mobile Devices & vehicle), protocol translation (Analog Sensors, Digital Sensors, Wireless protocols, RFID & etc.), data filtering and processing, security, system updating, data management and more. The System controller 464 also operates as a platform for application code that processes data and becomes an intelligent wheel management system. This includes operation of the Pneumatics system for Tire Pressure Management as well as data collection and event notifications. The System controller 464 application software performs the following functions: controls all trailer tire pressures as one; controls trailer tire pressures by pair (by tire if SS); controls trailer tire pressures individually; controls truck drive tire pressures by pair (by tire if SS); controls truck steer tire pressures; measures axle weight; measures trailer weight; measures truck weight; relative weight measurement accuracy; measures bearing temperature; measures brake temperature; measures other OOS violation causes; transmits meta data; transmits bulk data; cloud derived alerts for current conditions of monitored systems; cloud derived alerts for prediction conditions of monitored systems; other cloud services; smart phone GUI w/ interface by Bluetooth; smart phone GUI w/ interface by cloud; web connection by cloud; web API, and cloud stored load tables.

Besides these types of applications, the system controller 464, will has the ability to add new software features and applications, and to add new & approved functionality. In a preferred embodiment, the system controller 464, is configured with a network connection to the system via 3G/4G or wired. Additionally, there is a Mobile Application that operates on an Android based Smartphone or Apple iPhone. Preferably, the system controller 464, Mobile Application also supports Android Tablets or Apple iPads. The Mobile Application allows the configuration, programing, diagnostics and user setup of the system controller 464.

The system controller 464, configuration includes at least, but is not limited to the following: 3G/4G Modem Setup (Dial up connection number and Test) and (Schedules and Event Connectivity); CAN Address (Connect to CAN based Sensors such as the Parker Sensor for Weight), (Configure and Calibrate any sensors coming from the CAN network), and (Program connectivity and security parameters); Wireless Radios, including, but not limited to: WiFi (802.11ae)—(Off/On . . . Connected Vehicle WiFi Network . . . Name and connect to the appropriate software service . . . Test configuration); BLE (Bluetooth)—(Off/On . . . Connected Vehicle WiFi Network . . . Name and connect to the appropriate software service . . . Test configuration); 802.15.4 Zigbee—(Off/On . . . Connected to Zigbee enable sensors . . . Polling Schedules (Connectivity based on type of Sensor) . . . Name and connect to the appropriate software service . . . Test configuration; 433 Mhz RFID—(Off/On . . . Connected to 433 Mhz RFID Sensors . . . Name and connect to the appropriate software service . . . Test configuration); Wired Connections—Analog Sensors (Enter default valves and ranges for the Analog Sensor . . . Enter the type of sensor and wired location . . . Name and connect to the appropriate software service . . . Test configuration); USB and Serial Connections—(Enter Port #, Bit format, Parity and Speed . . . Type of Sensor and default data ranges . . . Name and connected to the serial device . . . Connect to the appropriate software service . . . Test the configuration); and GPS—Test GPS and Data & Time.

Figure 29:
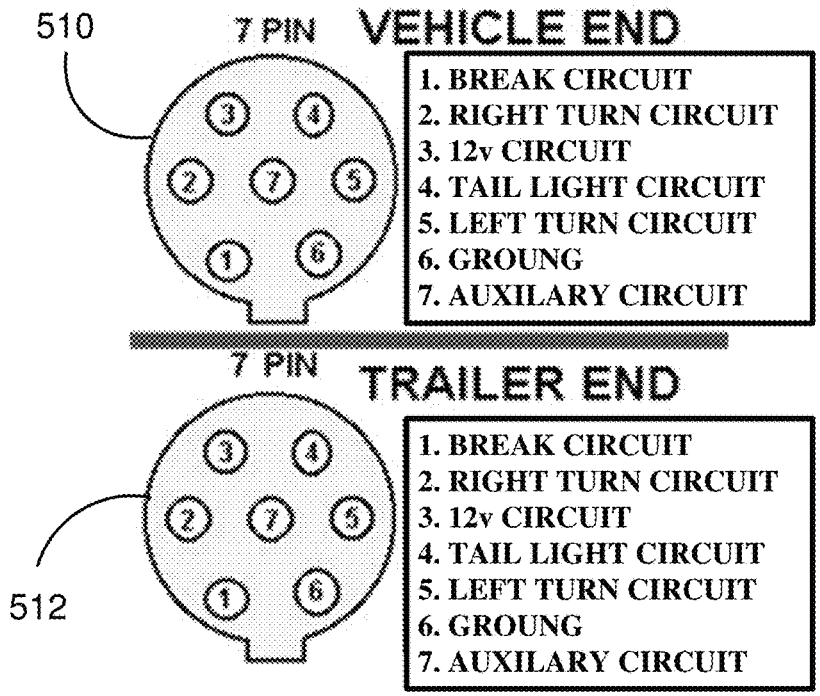
FIG. 29 shows a schematic of a power connector for a semi-tractor/trailer combination.

In a further embodiment of the present invention, a vehicle pairing system and methodology is provided. The pairing system is initiated when a power connector of a semi-tractor, such as a semi-tractor power connector 510, of FIG. 29, is united with a power connector of a semi-trailer, such as semi-trailer power connector 512, of FIG. 29.

Figure 30:
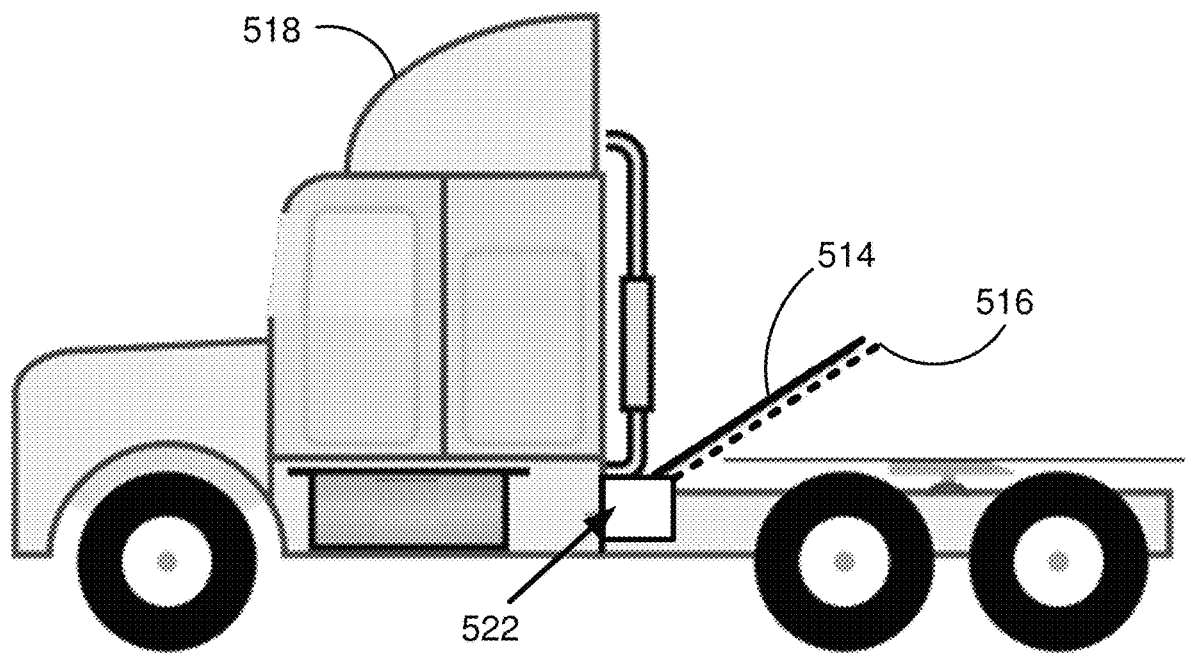
FIG. 30 shows a view in elevation of a semi-tractor of a semi-tractor/trailer combination with a tractor system control unit supported by the semi-tractor.

FIG. 30, shows both power and data lines, 514 and 516 respectively, of semi-tractor 518, for use in initializing paring of the semi-tractor 518 (also referred to herein as a powered tow unit 518) to a semi-trailer 520 (also referred to herein as a cargo transport unit 520), of FIG. 31. Upon connection of power connector 510 with power connector 512, a first system controller, such as 522, of the semi-tractor 518, both of FIG. 30, provides pairing process initiation data to a second system controller, such as 524, of a semi-trailer 520, both of FIG. 31. Included in the pairing process initiation data is a randomly selected, unique, identification code assigned to the semi-trailer 520, this unique code is then utilized, and associated with the semi-trailer 520, as a basis for all further communications between the semi-tractor/trailer combination 526, of FIG. 32. In a preferred embodiment, the pairing process initiation data is transmitted via hard wire, i.e., the pairing process initiation data is transmitted by way of: the auxiliary circuit 7, of FIG. 29; or the ground connection 6, of FIG. 29; or the 12v power connection 3, of FIG. 29, or a combination thereof. Most preferably, the auxiliary circuit 7, of FIG. 29, is used for ongoing, hard wire, data transfer between the system controllers 522 and 524, of the semi-tractor/trailer combination 526, of FIG. 32. Further shown by FIG. 31, is a wireless control unit 528. Data from the semi-tractor 518 is transmitted, for example, over the 12v circuit 3, of FIG. 29, to the wireless control unit 528 and the second control system 524. The data will preferably include necessary sensor and wireless security protocols, or private key, to connect wirelessly, the semi-tractor 518, with the semi-trailer 520. At that point, the semi-tractor/trailer combination 526, have a closed wired and wireless network forming the pairing system 527. Preferably, the wireless control unit 528, in addition to providing a wireless network for of the semi-tractor/trailer combination 526, the wireless control unit 528, further provides communication capabilities to devices external to the semi-tractor/trailer combination 526.

In a preferred embodiment, during the pairing process, the Truck provides a secure private security key (also referred to herein as a private key) that can be shared by all the wireless devices connected on the semi-tractor/trailer combination 526. This allows all the wireless technologies to pair up as a system without having to broadcast their identities & pairing options over the open network, which eliminates the issues of trucks or trailers pairing with the wrong vehicles. Another benefit is when the truck or trailer are turned off the secure private key would no longer be valid. A new key is generated upon the startup of the semi-truck 518, or the reconfiguration of the semi-tractor/trailer combination 526, which assures a new and different security key every time the semi-truck 518 is started.

Figure 43:
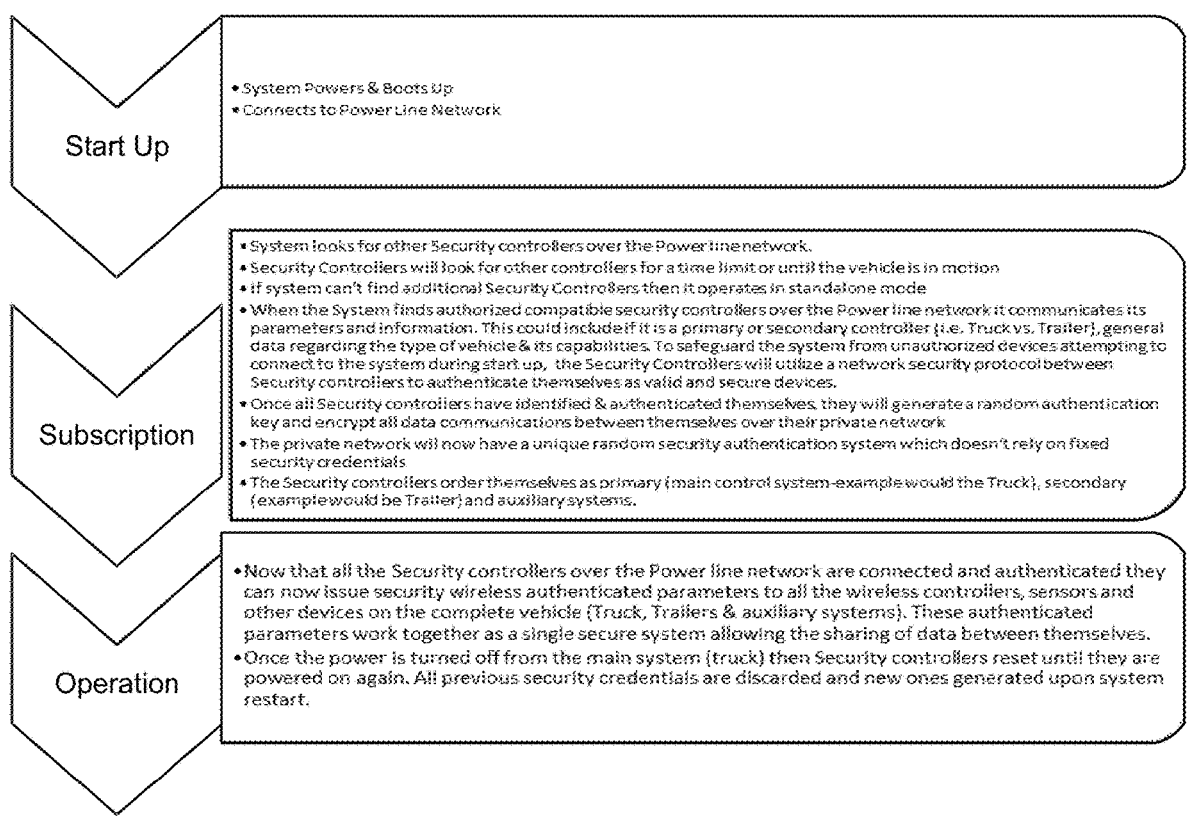
FIG. 43 is a flowchart of example operation of various embodiments of FIGS. 1-36.

The flow diagram 600 of FIG. 43 provides an overview of the operation of the pairing system 527 of FIG. 32.

Figure 33:
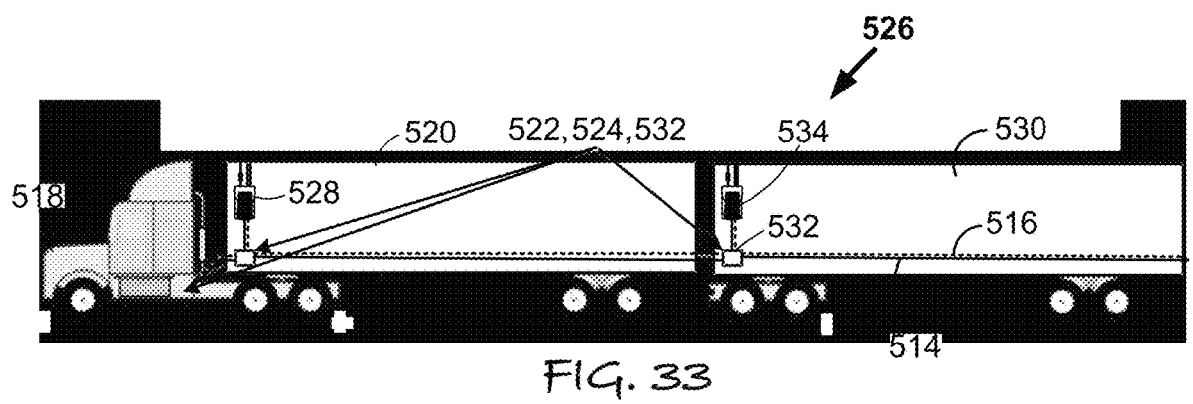
FIG. 33 is a side view in elevation of the semi-tractor/trailer and a third semi-trailer attached to the semi-tractor/trailer combination and supporting a third semi-trailer control system.

As shown by FIG. 33, a second semi-trailer 530, may be hooked to the first semi-trailer 520, of the semi-tractor/trailer combination 526. The second semi-trailer 530 is preferably equipped with a third system controller 532, and a second wireless control unit 534. The third system controller 532, is preferably interchangeable with the second system controller 524, and the second wireless control unit 534 is preferably interchangeable with the wireless control unit 528, of the semi-trailer 520.

Figure 34:
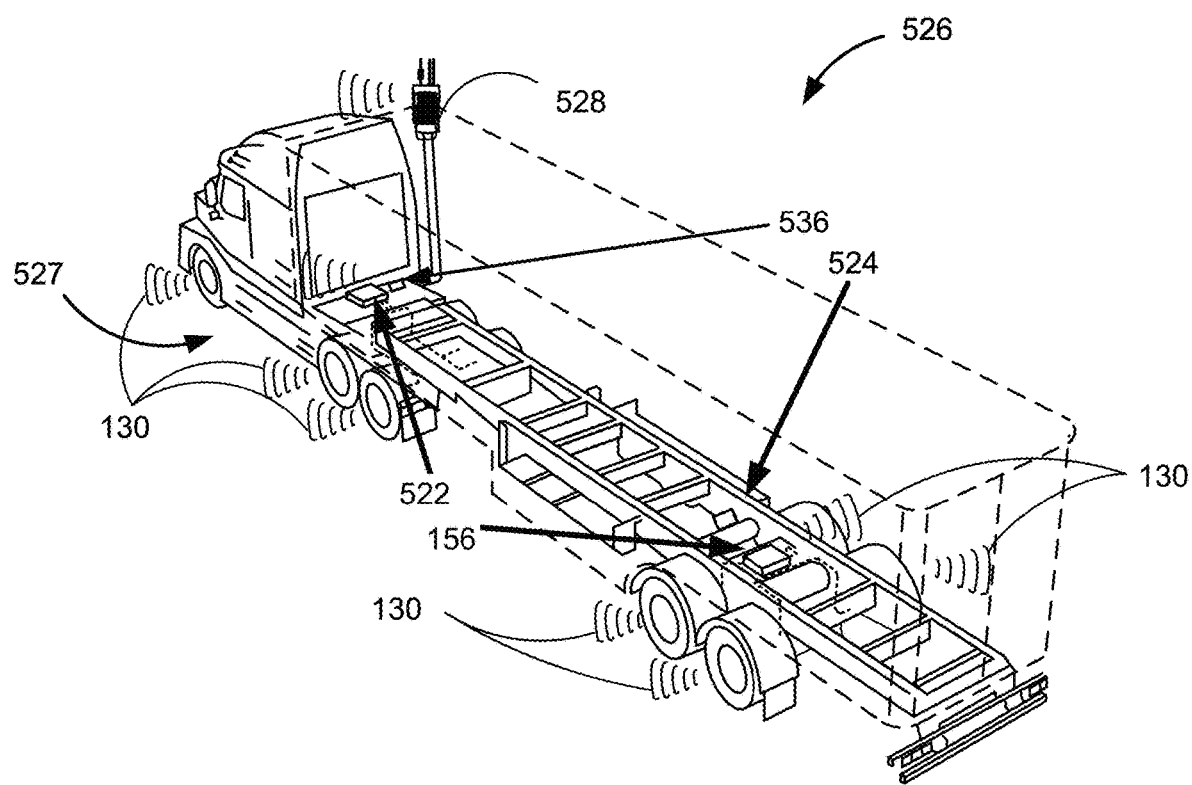
FIG. 34 is a perspective view in elevation of the semi-tractor/trailer combination equipped with a blind spot detection system.

FIG. 34 shows an integration of the tire pressure management system 110, of FIG. 10, with the pairing system 527, of FIG. 32. Preferably, the tire pressure monitoring sensors 130, of the tire pressure management 110, both of FIG. 10, provide tire pressure information from each tire of the semi-trailer 520 to the pressure management controller 156, of FIG. 21. The pressure management controller 156, in turn, conveys that information to the second system controller 524. The second system controller 524, passes that information to the wireless control unit 528, which transmits the tire pressure information to a truck wireless control unit 536. The truck wireless control unit 536, interacts with each the first system controller 522, and the wireless control system 528.

Figure 35:
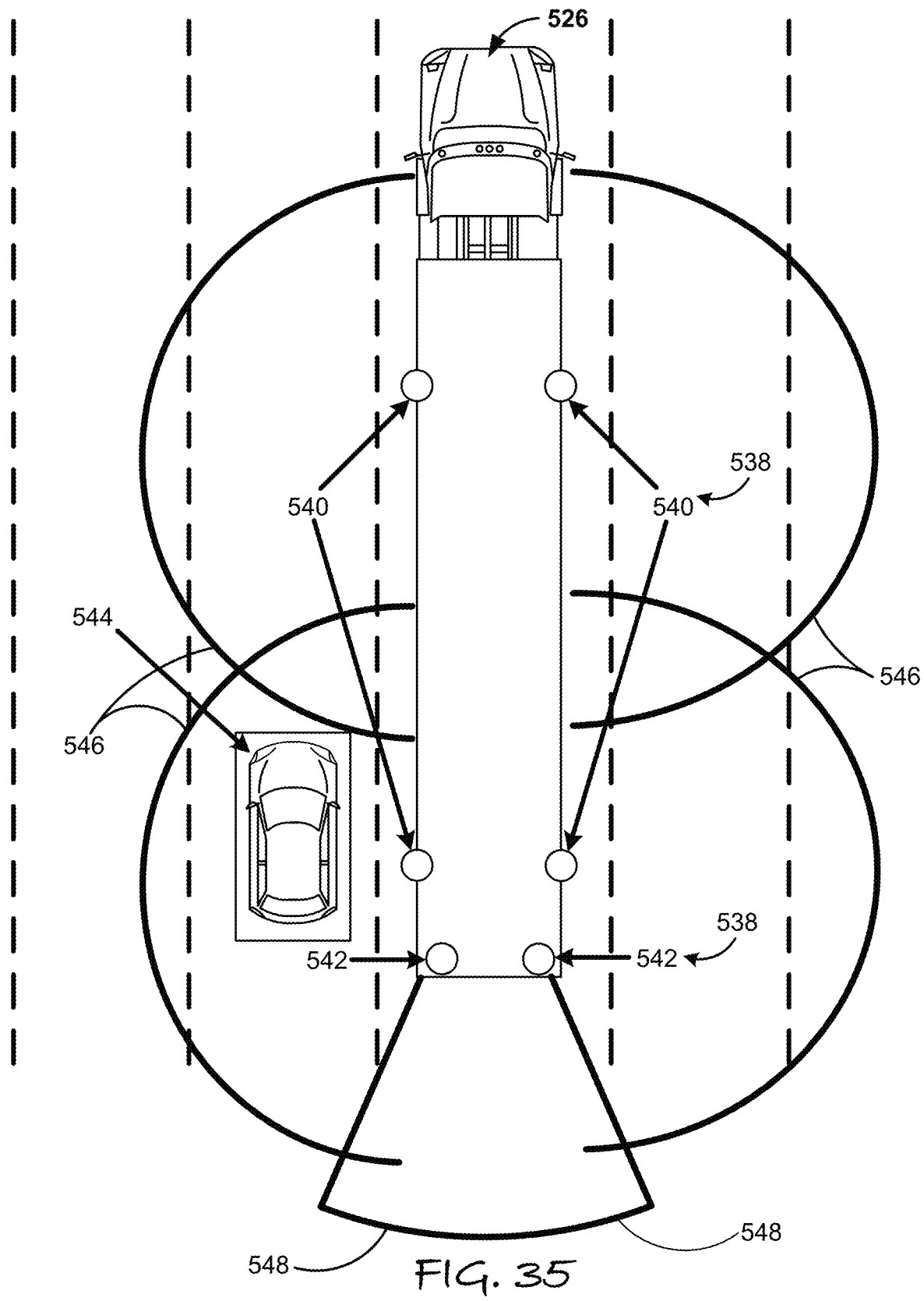
FIG. 35 is a top plan view of the semi-tractor/trailer combination equipped with blind spot detection system of FIG. 33.

FIG. 35 shows a further integration of an obstacle detection system 538, which provides a blind spot detection system 540, and a backup obstacle detection circuit 542. The blind spot detection system 540, generates a warning to an operator of the semi-tractor/trailer combination 526, when an obstacle, such as an auto 544, is within an operating zone 546, of the blind spot detection system 540. The blind spot detection system interacts with the second system controller 524, of FIG. 32, by providing obstacle present data to the second system controller 524. The second system controller 524, passes the obstacle present data to the wireless control system 528, which in turn passes the obstacle present data to the truck wireless control unit 536. The truck wireless control unit 536, passes the obstacle present data to the first system controller 522, which provides on visual, or audible prompt to the operator, alerting the operator of the presence of an object within the operating zone 546, of the blind spot detection system 540.

The backup obstacle detection circuit 542, provides a warning to the operator of the semi-tractor/trailer combination 526, when an obstacle, such as a loading dock, is within an operating zone 548, of the backup obstacle detection circuit 542. The backup obstacle detection circuit 542 interacts with the second system controller 524, of FIG. 32, by providing obstacle present data to the second system controller 524. The second system controller 524, passes the obstacle present data to the wireless control system 528, which in turn passes the obstacle present data to the truck wireless control unit 536. The truck wireless control unit 536, passes the obstacle present data to the first system controller 522, which provides a visual, or audible, prompt to the operator, alerting the operator of the presence of an object within the operating zone 548, of the backup obstacle detection circuit 542.

Figure 36:
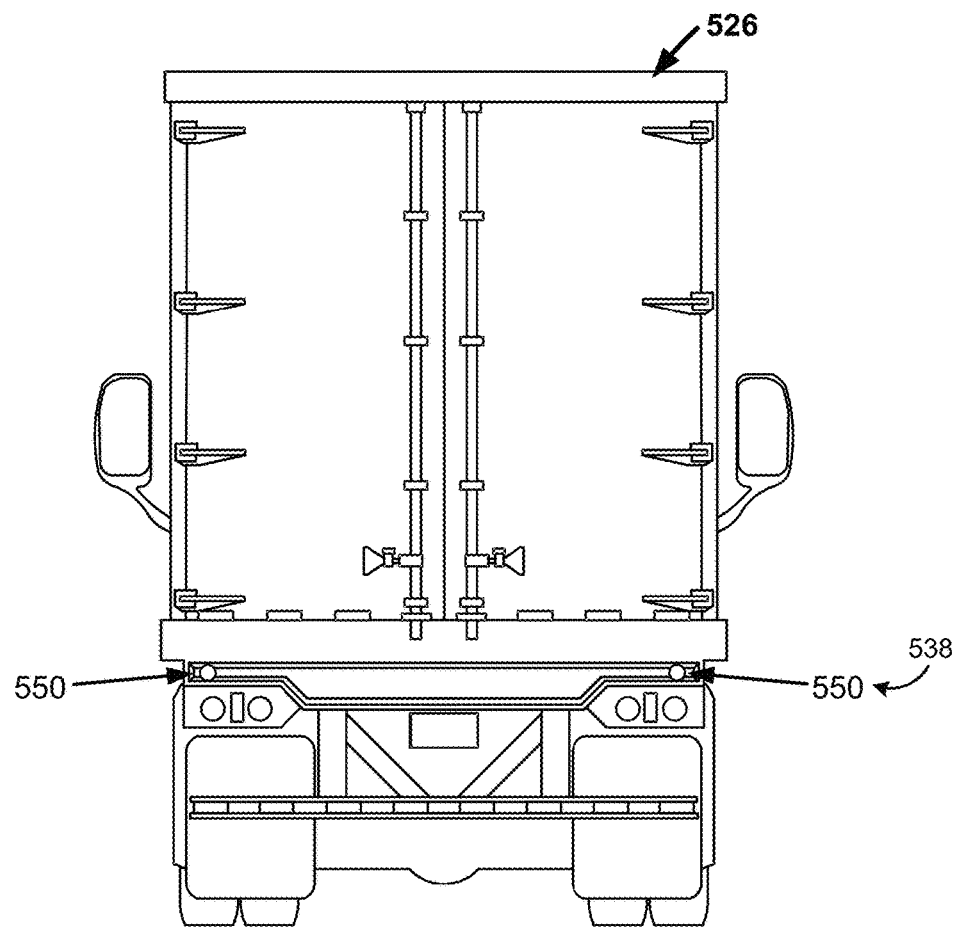
FIG. 36 is a rear view in elevation of the semi-tractor/trailer combination showing backup sensors of the obstacle detection system.

FIG. 36 shows a rear view in elevation of the semi-tractor/trailer combination 526, showing backup sensors 550, of the obstacle detection system 538. In a preferred embodiment, the backup sensors and blind spot sensors are preferably ultrasonic sensors. As those skilled in the art understand, other sensory technologies, such as radar, sonar, infer red, as well as other know detection technologies may be used.

Figure 37:
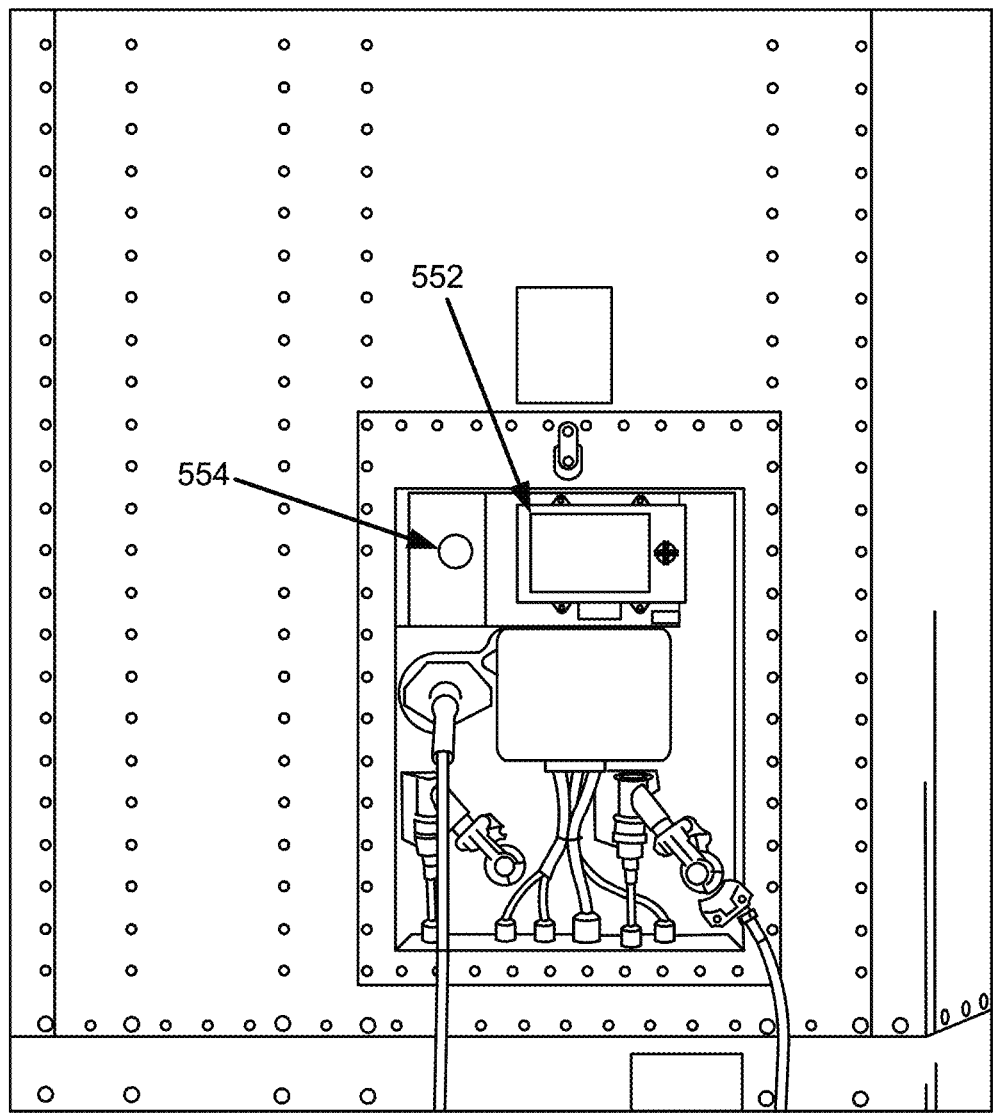
FIG. 37 shows a partial rear view in elevation of an example cargo transport unit.

FIG. 37 shows a partial rear view in elevation of the cargo transport unit 520, supporting a vehicle status device 552 of a cargo transport unit health status system 554 (of FIG. 39) and a CAN (Controller Area Network) bus connector 556, which provides for connection of CAN bus connector of the powered tow unit 518 (of FIG. 33).

FIG. 38 shows a system block diagram of the cargo transport unit health status system 554, which includes at least, but not limited to, the vehicle status device 552 interacting with and receiving information from the second system controller such as 524, of the cargo transport unit 520 (both of FIG. 31), the CAN connector 556, and seven pin junction box. When the powered tow unit 518 is coupled to the cargo transport unit 520, the types of most recent status information received by the vehicle status device 552 includes, but is not limited to, one of three status levels: OK, CAUTION, or REPAIR.

Cargo Transport Unit OK Status.

Display at last the message OK and provide the date and time of the most recent update, as shown by FIG. 40. Displaying the OK message connotes the cargo transport unit 520 is totally ready for use. For the cargo transport unit health status system 554 to display the OK message on the vehicle status device 552, at least, but not limited to, the following status states need to be present:
    All Tires are at a nominal safe pressure for operation 85 psi to 110 psi
    Clearance, Brake and Turning Lights are operational
    Door Closed
    No Tire or system leaks
    Air Tank Pressure is over 80 psi (Pressure adequate to release Parking Brakes)
    ABS is getting power
    No ABS Faults and all have been cleared
    Second system controller Faults
        No Critical Operational Sensor & component faults that have errors such as Pressure, Temperature, Valves, ECU, Cellular, BLE, GPS and others to be defined
        Backup Battery at over 70%
        All TPMS Sensors are sending data
        Weight System Nominal
        Wheel End Temperature Sensors operational Cargo Transport Unit CAUTION Status.

Display at last the message CAUTION and provide the date and time of the most recent update. Displaying the CAUTION message connotes the cargo transport unit 520 is ready for use, but the operator must be cognizant that a feature of the cargo transport unit 520 is not optimal and may deteriorate to a failure. For the cargo transport unit health status system 554 to display the CAUTION message on the vehicle status device 552, at least, but not limited to, at least one of the following status states need to be present: Second system controller
    Door is Open
    Minor Tire(s) Leak but can be maintain by the Second system controller
    No Tire(s) is less than 75 psi (need to either manual add air or connect power & air to the cargo transport unit and allow the Second system controller to inflate the tires to a safe to operate PSI level (over 75 psi)— Instruct User to wait until tire(s) that need inflation are filled to proper safe PSI level
    Clearance, Brake and Turning Lights are operational
    No ABS Faults all have been cleared
    ABS is getting power
    Second system controller—No Critical Operational Sensor & component faults that have errors such as, but not limited to: Pressure, Temperature, Valves, ECU, Cellular, BLE, GPS
    Weight System not reporting accurate data or fault
    Wheel End Temperature Sensor(s) have a fault
    TPMS Sensor(s) have a fault or no communication
    Backup Battery at under 70%
    IP Camera not operating (Cargo Load)

Cargo Transport Unit REPAIR Status.

Display at last the message REPAIR and provide the date and time of the most recent update. Displaying the REPAIR message connotes the cargo transport unit 520 is NOT ready for use, and the operator is advised the failure should be repaired prior to use. For the cargo transport unit health status system 554 to display the REPAIR message on the vehicle status device 552, at least, but not limited to, at least one of the following status states need to be present:
    Tire(s) are not at a nominal safe pressure for operation 85 psi to 110 psi and one or more have a major leak
    Tire(s) are below 60 psi and have a leak that can't be maintained by Second system controller inflation system
    Clearance, Brake and Turning Lights have a light out or circuit short
    ABS Faults not cleared (Don't show ABS is not getting power fault)
    Display of the ABS Fault Code and Description
    Second system controller Faults
        Second system controller hasn't come on-line and isn't communicating could be damage or cable connection broken.
        Critical Operational Sensor & component faults that have errors such as, but not limited to: Pressure, Temperature, Valves, ECU, Cellular, BLE, or GPS
        System can't provide Tire Inflation or Deflation operations
        Backup Battery at below 20%
        None of TPMS Sensors are sending data
        Nonoperation Weight System
        Nonoperational Wheel End Temperature Sensors
        Door Sensor not working
        Not getting power from alternate power sources (i.e. Clearance lights & solar panel)

FIG. 39 shows an internal block diagram of an embodiment of the vehicle status device 552. Included to the diagram is a present invention is an energy supply unit 560, which in a preferred embodiment is a lithium ion battery, but one skilled in the art is aware of alternate energy supply units that will fulfill the required function. Additionally, shown by FIG. 39 is an eight-pin connector 562, and a four-way toggle push button 564. The four-way toggle push button 564 facilitates a review by the operator of the various status states associated with a condition status displayed on a screen 566 of the vehicle status device 552 (i.e., OK, or CAUSION, or REPAIR).

FIG. 40 shows, in cutaway, a verity of functional components, but not all functional components of the vehicle status device 552. The components shown include: a housing 568; a computing device 570 supported by the housing; a communication circuit 572 supported by the housing 568 and communicating with the computing device 570 and the second system controller 524; a display 566 supported by the housing 568, and communicating with the computing device 570; the energy supply unit 560 supported by the housing 568 and communicating with each the computing device 570, communication circuit 572, and display 566 by way of a cargo transport unit health status system power circuit 574, which controls power distribution to each said computing device 570, communication circuit 572, and display 566 when the powered tow unit 518 is mechanically, electrically, and pneumatically coupled to the cargo transport unit 520; a global poisoning system 576 supported by said housing 568 and communicating with the computing device 570 and the second system controller 524; a firmware module 578 supported by the housing 568 and communication with the computing device 570; a memory device 580 supported by the housing 568 and communicating with the computing device 570; a cargo transport unit health analysis routine stored in the memory device 580 and loaded on the computing device 570; a display driver circuit 582 communicating with the computing device 570 and the display 566, the display driver circuit 566 accepts signal inputs from the computing device 570 and generates display signals of predetermined voltage, current, timing and demultiplexing, said display signals are transmitted to said display 566, wherein said display 566 presents a desired text or image; and a four-way toggle push button 564 communicating with the computing device 570, the four-way toggle push button 564 facilitates a review by the operator of the various status states associated with a condition status of the cargo transport unit 520 displayed on the display 566.

Figure 41:
FIG. 41 shows an example display of a status state of a cargo transport unit utilized in accordance with assorted embodiments.

FIG. 41 shows a typical display of a status state of the cargo transport unit 520 being displayed on the display 556 of the vehicle status device 552. Further shown by FIG. 41 is the four-way toggle push button 564, which accommodates navigation by the operator to specific status states associated with the condition status of the cargo transport unit 520 displayed on the display 566.

Figure 42:
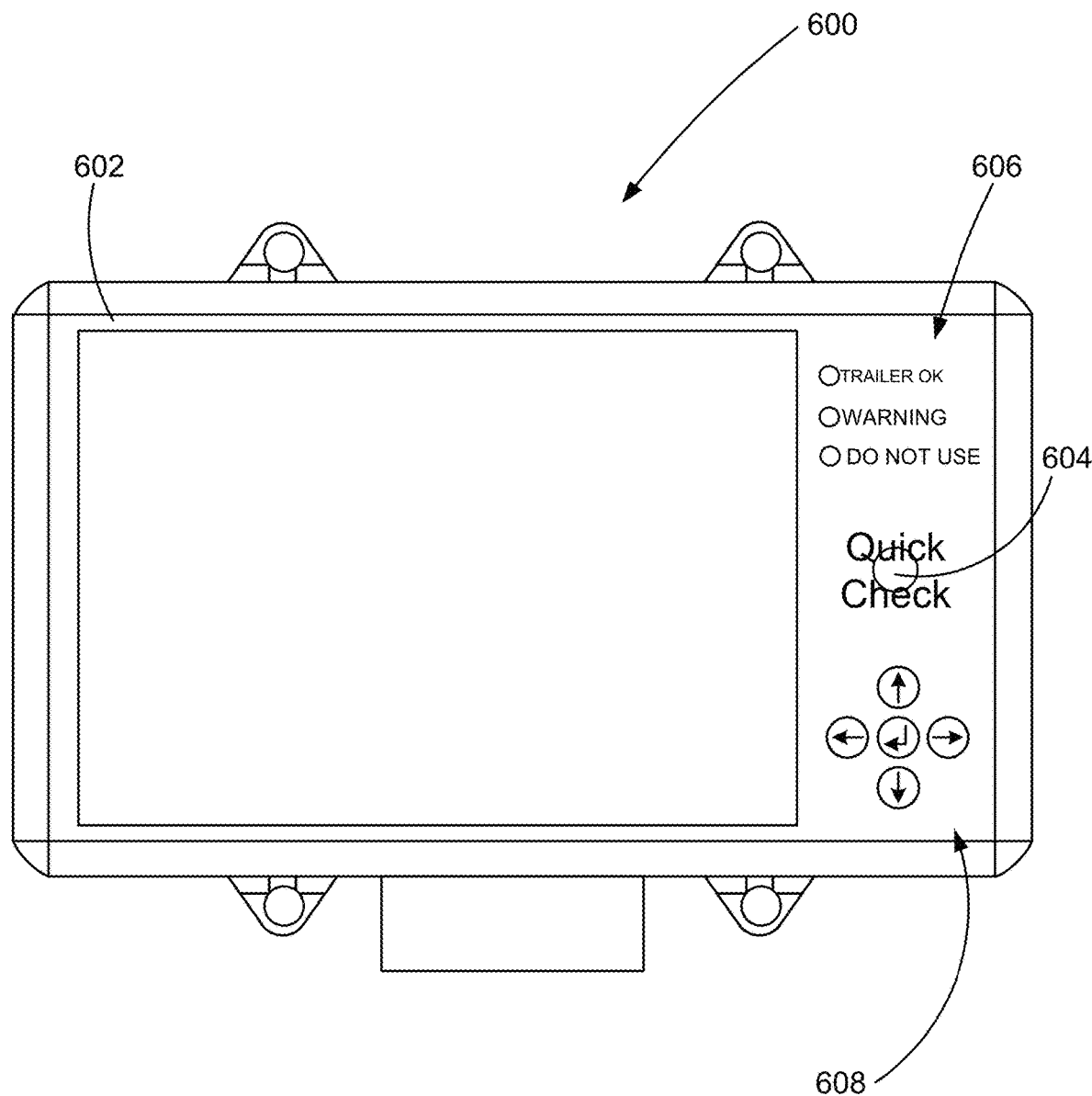
FIG. 42 shows an embodiment of an example vehicle status device configured in accordance with some embodiments.

FIG. 42 shows an alternate embodiment of a vehicle status device 600 which functions like vehicle status device 552, but provides an alternate structure and method of accessing the specific status states associated with the condition status of the cargo transport unit 520 being displayed on the display 610, which is supported by housing 602. The housing 602 further supports a quick check button 604, which when activated illuminates one of the three status lights (TRAILER OK or WARNING or DO NOT USE) of the status matrix 606, and a navigation input cluster 608. The navigation input cluster 608 is useful to an operator when identifying a fault condition. For example, if the WARNING light of the status matrix 606 illuminates upon an activation of the quick check button 604, by using the navigation input cluster 608, the operator the can navigate to the status of the functional components of the cargo transport unit 520 being monitored such as:

Door is Open
Minor Tire(s) Leak but can be maintain by the Second system controller
Tire(s) is less than 75 psi (need to either manual add air or connect power & air to the cargo transport unit and allow the Second system controller to inflate the tires to a safe to operate PSI level (over 75 psi)—Instruct User to wait until tire(s) that need inflation are filled to proper safe PSI level
Clearance, Brake and Turning Lights are operational
No ABS Faults all have been cleared
ABS is getting power
Second system controller—No Critical Operational Sensor & component faults that have errors such as, but not limited to: Pressure, Temperature, Valves, ECU, Cellular, BLE, GPS
Weight System not reporting accurate data or fault
Wheel End Temperature Sensor(s) have a fault
TPMS Sensor(s) have a fault or no communication
Backup Battery at under 70%
IP Camera not operating (Cargo Load)

and note that: the door is open; a tire or tires, are less than 75 psi (need to either manual add air or connect power & air to the cargo transport unit and allow the Second system controller to inflate the tires to a safe to operate PSI level (over 75 psi)—Instruct User to wait until tire(s) that need inflation are filled to proper safe PSI level; a wheel end sensor or sensors have a fault; and the backup battery is at or under 70%.

As will be apparent to those skilled in the art, several modifications could be made to the preferred embodiments which would not depart from the spirit or the scope of the present invention. While the presently preferred embodiments have been described for purposes of this disclosure, numerous changes and modifications will be apparent to those skilled in the art. Among those changes and modifications, a skilled artisan would understand that a power tow unit may be a tractor of a tractor trailer combination and that a cargo transport unit may be a trailer of said tractor trailer combination. Alternatively, a skilled artisan would understand that a power tow may be a locomotive of a locomotive and rail car combination and that a cargo transport unit may be a rail car of said locomotive rail car combination, or that the power tow unit may be a towboat of a towboat barge combination and that cargo transport unit may be a barge of said towboat barge combination. Insofar as these changes and modifications are within the purview of the appended claims, they are to be considered as part of the present invention.

What is claimed is:

1. A combination comprising:
a powered tow unit providing a first vehicle frame;
a cargo transport unit providing a second vehicle frame and configured to be mechanically coupled, electrically coupled and pneumatically coupled to said powered tow unit;
a first system controller supported by said first vehicle frame and in electrical interaction with the powered towing unit, said first system controller providing at least first control electronics confined by a first housing;

a second system controller supported by said second vehicle frame of said cargo transport unit, said second system controller providing at least a second control electronics confined by a second housing, said second system controller configured to communicate with said first system controller; and a cargo transport unit health status system supported by said cargo transport unit and configured to communicate with said second system controller and interact with said first system controller when said powered tow unit is mechanically, electrically, and pneumatically coupled to said cargo transport unit, the cargo transport unit health status system consisting of a display to indicate a detected error in the cargo transport unit that can be overcome by the second system controller during movement of the cargo transport unit.

2. The combination of claim 1, further comprising:
a power circuit provided by said powered tow unit and communicating with said first system controller;
a data circuit provided by said powered tow unit and communicating with said first system controller;
a ground circuit provided by said powered tow unit and communicating with said first system controller;
an auxiliary circuit provided by said powered tow unit and communicating with said first system controller;
a power circuit provided by said cargo transport unit communicating with each said second system controller and said power circuit provided by said powered tow unit;
a data circuit provided by said cargo transport unit and communicating with each said second system controller and said data circuit provided by said powered tow unit;
a ground circuit provided by said cargo transport unit and communicating with each said second system controller and said ground circuit provided by said powered tow unit; and
an auxiliary circuit provided by said cargo transport unit and communicating with each said second system controller and said auxiliary circuit provided by said powered tow unit.

3. The combination of claim 2, in which said trailer health status system includes at least a vehicle status device, in which said vehicle status device comprising:
a housing;
a computing device supported by said housing;
a communication circuit supported by said housing and communicating with said computing device and said second system controller;
a display supported by said housing, communicating with said computing device;
an energy supply unit supported by said housing and communicating with each said computing device, communication circuit, and display by way of a cargo transport unit health status system power circuit, when said powered tow unit is mechanically, electrically, and pneumatically coupled to said cargo transport unit, wherein the cargo transport unit health status system power circuit is supported by said housing and controls power distribution to each said computing device, communication circuit, and display;
a global positioning system supported by said housing and communicating with said computing device and said second system controller;
a firmware module supported by said housing and communication with said computing device;
a memory device supported by said housing and communicating with said computing device;
a cargo transport unit health analysis routine stored in said memory device and loaded on said computing device;
a display driver circuit communicating with the computing device and the display, the display driver circuit accepts signal inputs from the computing device and generates display signals of predetermined voltage, current, timing and demultiplexing, said display signals are transmitted to said display, wherein said display presents a desired text or image; and
a four-way toggle push button communicating with the computing device, said four-way toggle push button facilitates a review by the operator of the various status states associated with a condition status displayed on the display.

4. The combination of claim 3, in which said second system controller provides said vehicle status device with status information via said communication circuit, said status information comprising:
tire pressure of a tire supporting said cargo transport unit;
absence of a pressure leak of the tire;
state of a door of said cargo transport unit;
state of a plurality of running lights of said cargo transport unit;
state of a brake light of said cargo transport unit;
state of a turn signal of said cargo transport unit;
state of an automatic braking system of said cargo transport unit; and
state of said second controller of said cargo transport unit.

5. The combination of claim 4, further comprising a vehicle pairing system communicating with each first and second system controllers and an obstacle detection system providing a blind spot detection circuit, said blind spot detection circuit supported by said second vehicle frame, said blind spot detection circuit alerts an operator of a coupled power tow unit and cargo transport unit of a presence of an obstacle in a blind spot of said coupled power tow unit and cargo transport unit, said vehicle status device further comprising a trailer health status indicator supported by said housing and communicating with said computing device, said status information received by said vehicle status device from said second system controller is in turn provided to said computing device, which stores said status information in said memory device, said computing device uploads said status information from said memory device and analyses said status information using said trailer health analysis routine, which determines a health status of said cargo transport unit, upon determining said health status of said cargo transport unit, said computing device relays said determined health status to said trailer health status indicator, and wherein said vehicle pairing system further comprising;
a first pairing signal generated by a first pairing circuit of a first control electronics of said first system controller, said first pairing circuit transmits said first pairing signal to a second pairing circuit of a second control electronics of a second system controller by way of said power circuit provided by said powered tow unit communicating with said power circuit of said cargo transport unit, said second pairing circuit passing said first pairing signal to said second control electronics; and
a second pairing signal generated by said second control electronics and provided to said second pairing circuit, said second pairing circuit transmits said second pairing signal to said first pairing circuit by way of said power circuit provided by said cargo transport unit communicating with said power circuit of said powered tow unit, said first pairing circuit passing said second pairing signal to said first control electronics, wherein said first pairing signal includes at least a unique, randomly generated identification code, said second pairing signal includes at least an affirmation code, said affirmation code acknowledges receipt and acceptance of said unique, randomly generated identification code by said second control electronics, and further wherein upon transmission of said second pairing signal by said second pairing circuit, said second control electronics initializes a second wireless communication module of said second control electronics, and upon receipt of said second pairing signal by said first pairing circuit, said first control circuit initializes a first wireless communication module of said control electronics, said first wireless module establishes communication with said second wireless module, and in which said power tow unit is a tractor of a tractor trailer combination and said cargo transport unit is a trailer of said tractor trailer combination, else said power tow unit is a locomotive of a locomotive and rail car combination and said cargo transport unit is a rail car of said locomotive rail car combination, else said power tow unit is a towboat of a towboat barge combination and said cargo transport unit is a barge of said towboat barge combination.

6. The combination of claim 5 wherein upon initialization of said first and said second wireless modules, further data communication between said powered tow unit and said cargo transport unit is conducted wirelessly until such time as said powered tow unit is decoupled from said cargo transport unit, upon a decoupling of said powered tow unit from said cargo transport unit each said powered tow unit and said cargo transport unit discard said unique, randomly generated identification code, the combination further comprising:
an first axle supporting said second vehicle frame;
a first suspension disposed between and secured to each said second vehicle frame and said first axle;
a load detection device interacting with said first suspension and communicating with said second system controller, said second system controller supported by said second vehicle frame;
a second axle supporting said first vehicle frame;
a second suspension disposed between and secured to each said first vehicle frame and said second axle;
a second load detection device interacting with said second suspension and communicating with said second system controller; and
an obstacle detection system providing a blind spot detection circuit, said blind spot detection circuit supported by the second vehicle frame, said blind spot detection circuit alerts an operator of said coupled power tow unit and cargo transport unit of a presence of an obstacle in a blind spot of said coupled power tow unit and cargo transport unit.

7. The combination of claim 6, in which said cargo transport unit of said coupled power tow unit and cargo transport unit is a semi-trailer, and further in which said first system controller is in electrical communication with said second system controller, and further in which the operator is alerted to the presence of the obstacle in the blind spot by way of a visual prompt.

8. The combination of claim 6, in which said cargo transport unit of said coupled power tow unit and cargo transport unit is a semi-trailer, and further in which said first system controller is in electrical communication with said second system controller, and further in which the operator is alerted to the presence of the obstacle in the blind spot by way of a an audio prompt.

9. A method comprising:
attaching a trailer to a tractor via a mechanical mechanism;
connecting a trailer controller and a secondary controller to a tractor controller, the trailer controller and secondary controller each physically positioned on the trailer;
detecting, with the trailer controller, an error with at least one operating component of the trailer;
evaluating, with the trailer controller, a capability of a secondary system operated by the secondary controller; and
indicating a condition of the trailer corresponding to the secondary system allowing motion of the trailer and an operational status in the at least one operating component during motion of the trailer despite the presence of the error.

10. The method of claim 9, wherein the error is a leak in a tire of the trailer and the secondary system consists of an air delivery mechanism configured to provide air pressure to the tire while the tire is in rolling motion, as directed by the secondary controller.

11. The method of claim 9, wherein the capability of the secondary system is an amount of air pressure the secondary system can provide to a tire and the trailer controller evaluates an amount of air leaking from the tire compared to the amount of air the secondary system can provide to maintain a tire pressure while the tire is in rolling motion.

12. The method of claim 9, wherein the capability of the secondary system is a pressurization of a tank supplying air to a tire of the trailer, the tank physically mounted onto the trailer.

13. The method of claim 9, further comprising providing an instruction in response to the condition via a display mounted on the trailer, the instruction corresponding with an action to be undertaken prior to the secondary system being capable of maintaining the operational status while the trailer is in motion.

14. A method comprising:
attaching a trailer to a tractor via a mechanical mechanism;
connecting a trailer controller to a tractor controller, the trailer controller physically positioned on the trailer;
detecting, with the trailer controller, an error with at least one operating component of the trailer;
determining, with the trailer controller, an operable capability of at least one trailer component;
evaluating, with the trailer controller, the error in the at least one trailer component by comparing an operation degradation corresponding with the error to the operable capability of the at least one trailer component; and
informing an action necessary to allow safe motion of the trailer, the action generated by the trailer controller.

15. The method of claim 14, wherein the informed action instructs a repair is necessary in the at least one trailer component prior to motion of the trailer.

16. The method of claim 14, wherein the informed action indicates a single trailer component of the at least one trailer components to be repaired to bring the trailer into an operable status.

17. The method of claim 14, wherein the trailer controller characterizes the error by differentiating between a fatal error and a manageable error, the manageable error corresponding with an operating parameter that can be maintained in an operable range during motion of the trailer by a secondary system mounted on the trailer.

18. The method of claim 14, wherein the trailer controller characterizes the error by differentiating between a repairable error and a non-repairable error, the repairable error corresponding with an operating parameter that can be corrected without replacing at least one trailer component and the non-repairable error corresponding with an operating parameter that cannot be corrected without replacing at least one trailer component.

19. The method of claim 14, wherein the trailer controller characterizes the error by differentiating between a major leak and a minor leak, the major leak corresponding with a loss of air from a tire beyond an air supply capacity of a secondary system of the trailer, the minor leak corresponding with a loss of air from the tire within the air supply capacity of the secondary system.

20. The method of claim 14, wherein the informed action is indicated on a display mounted on the trailer prior to the tractor being started.

* * * * *